US009725170B2

(12) United States Patent
Daler et al.

(10) Patent No.: US 9,725,170 B2
(45) Date of Patent: Aug. 8, 2017

(54) VERTICAL TAKE-OFF AND LANDING AERIAL VEHICLE

(71) Applicant: ECOLE POLYTECHNIQUE FEDERALE DE LAUSANNE (EPFL), Lausanne (CH)

(72) Inventors: Ludovic Daler, Lausanne (CH); Arnaud Garnier, Pully (CH); Adrien Briod, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 159 days.

(21) Appl. No.: 14/851,068

(22) Filed: Sep. 11, 2015

(65) Prior Publication Data

US 2016/0001875 A1    Jan. 7, 2016

Related U.S. Application Data

(63) Continuation-in-part of application No. 14/301,639, filed on Jun. 11, 2014, now Pat. No. 9,611,032.

(30) Foreign Application Priority Data

Jun. 11, 2013    (EP) ..................................... 13171364
Jun. 11, 2014    (WO) ................. PCT/EP2014/062129

(51) Int. Cl.
| | |
|---|---|
| B64C 17/06 | (2006.01) |
| B64C 39/02 | (2006.01) |
| B64C 17/00 | (2006.01) |
| B64C 27/20 | (2006.01) |

(52) U.S. Cl.
CPC ............ B64C 39/024 (2013.01); B64C 17/00 (2013.01); B64C 27/20 (2013.01); *B64C 2201/027* (2013.01)

(58) Field of Classification Search
CPC ......... B64C 17/00; B64C 17/06; B64C 27/20; B64C 27/10; B64C 27/0091
USPC ....... 244/17.11, 6, 7 R, 7 B, 7 A, 12.1–12.5, 244/17.23, 17.25
See application file for complete search history.

(56) References Cited

U.S. PATENT DOCUMENTS

| | | | | |
|---|---|---|---|---|
| 3,350,035 A | * | 10/1967 | Schlieben | ............... B64C 29/02 244/34 R |
| 3,633,849 A | * | 1/1972 | Kling | ..................... B64C 27/20 244/12.2 |
| 4,505,346 A | * | 3/1985 | Mueller | ................ B62D 57/04 180/21 |
| 6,402,088 B1 | * | 6/2002 | Syrovy | .................. B64C 27/18 244/10 |
| 6,976,899 B1 | * | 12/2005 | Tamanas | ................ A63G 29/02 446/178 |

(Continued)

*Primary Examiner* — Justin Benedik
(74) *Attorney, Agent, or Firm* — Seyfarth Shaw LLP; Brian Michaelis

(57) ABSTRACT

A VTOL (vertical take-off and landing) aerial flying vehicle comprising an inner frame, a gimbal system and an outer frame, the inner frame comprising a propulsion system and a control system. The propulsion system being able to generate a lift force. The VTOL may also include a decoupling mechanism having either a linear or non-linear beam coupled to a ring. The beam may optionally include sliders at ends thereof that provide an additional rotation freedom to the inner frame.

20 Claims, 29 Drawing Sheets

(56) References Cited

U.S. PATENT DOCUMENTS

| | | | |
|---|---|---|---|
| 7,905,447 B2* | 3/2011 | Stroud | B64C 27/10 244/17.23 |
| 8,464,978 B2* | 6/2013 | Yim | B64C 27/20 244/17.23 |
| 8,528,854 B2* | 9/2013 | Yan | A63H 27/12 244/119 |
| 9,067,667 B2* | 6/2015 | Yan | B64C 1/00 |
| 2010/0224723 A1* | 9/2010 | Apkarian | A63H 27/12 244/65 |

* cited by examiner

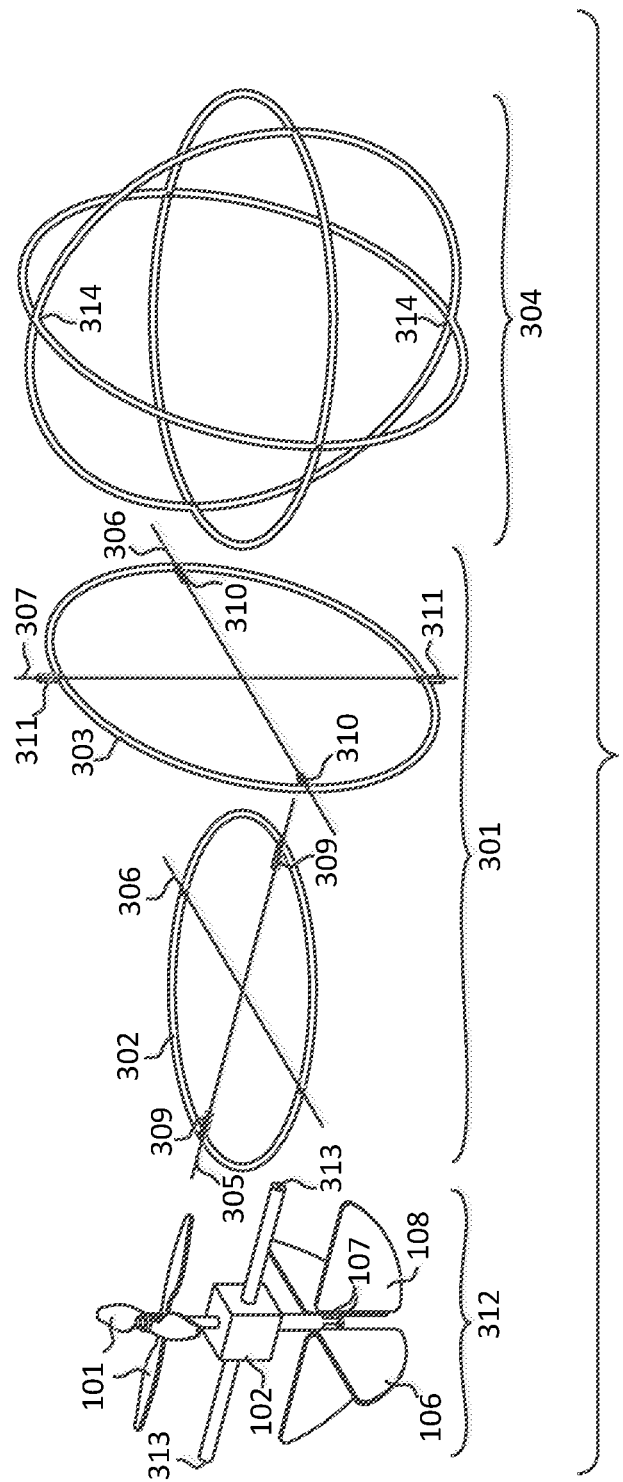

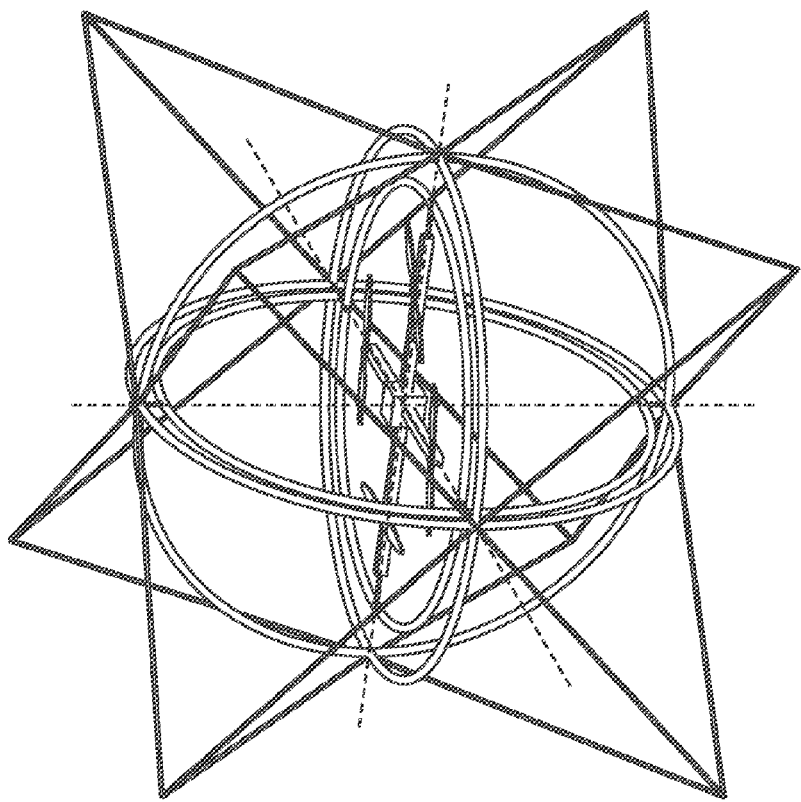
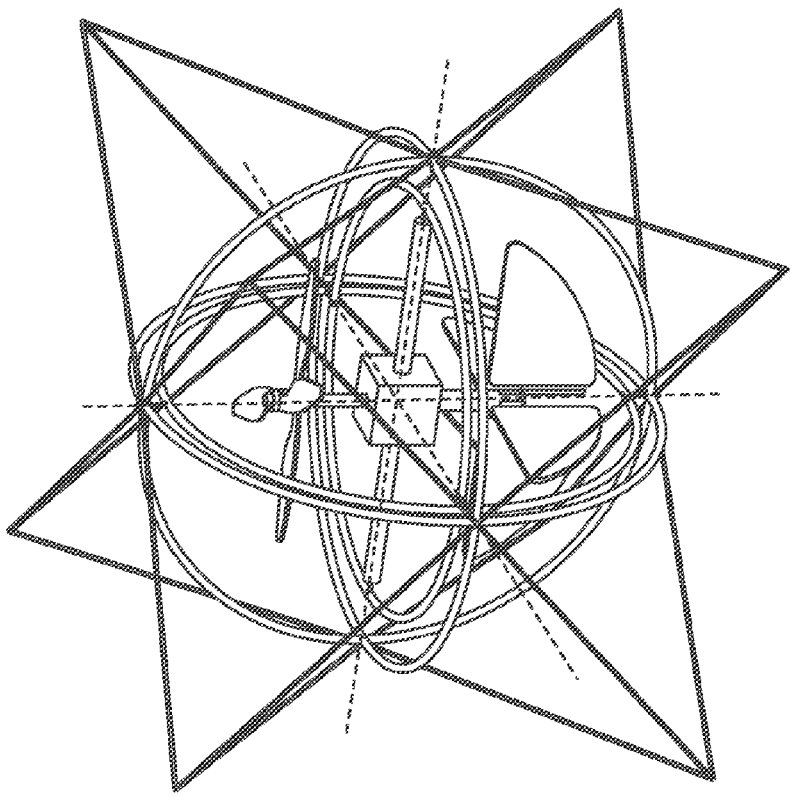
FIG. 14B
FIG. 14A

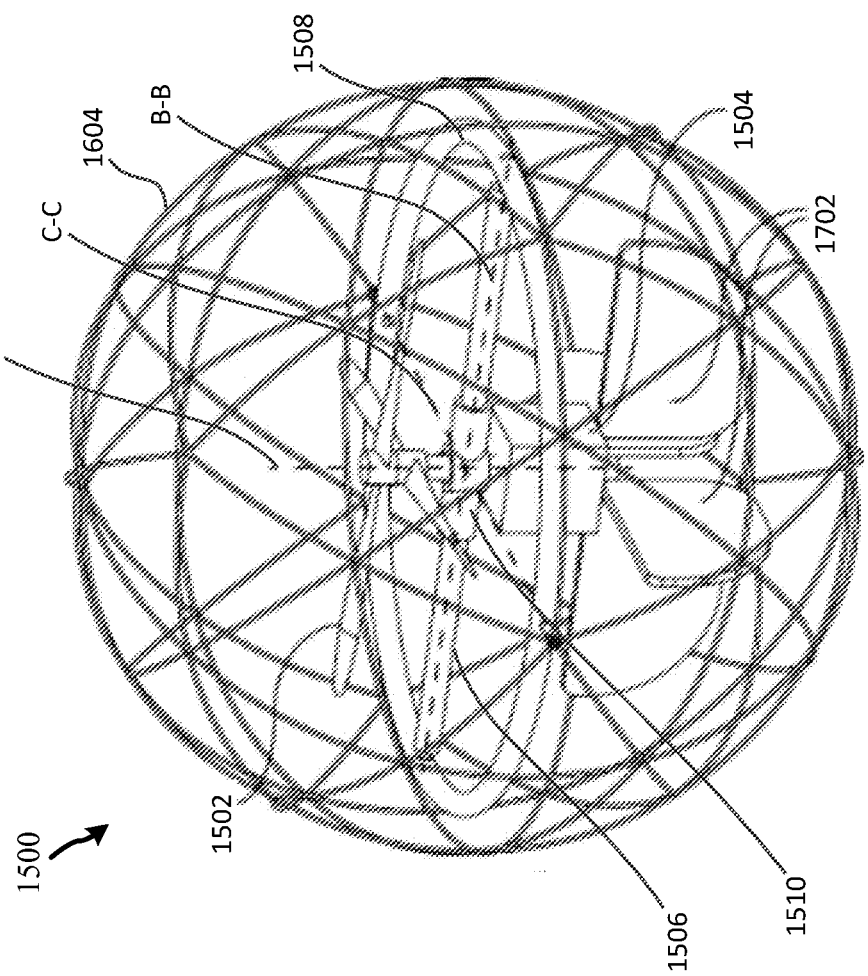

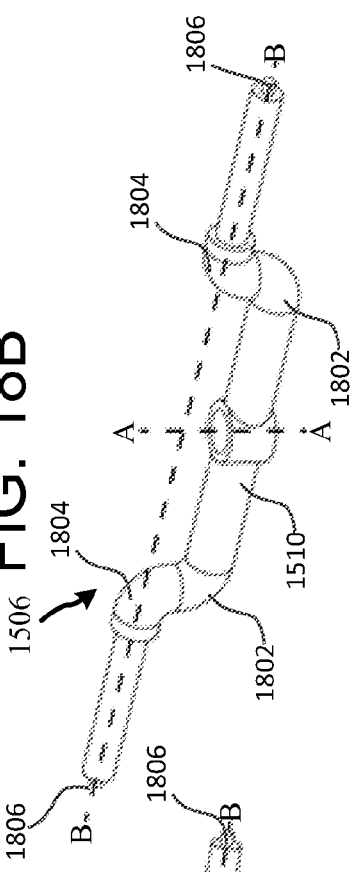
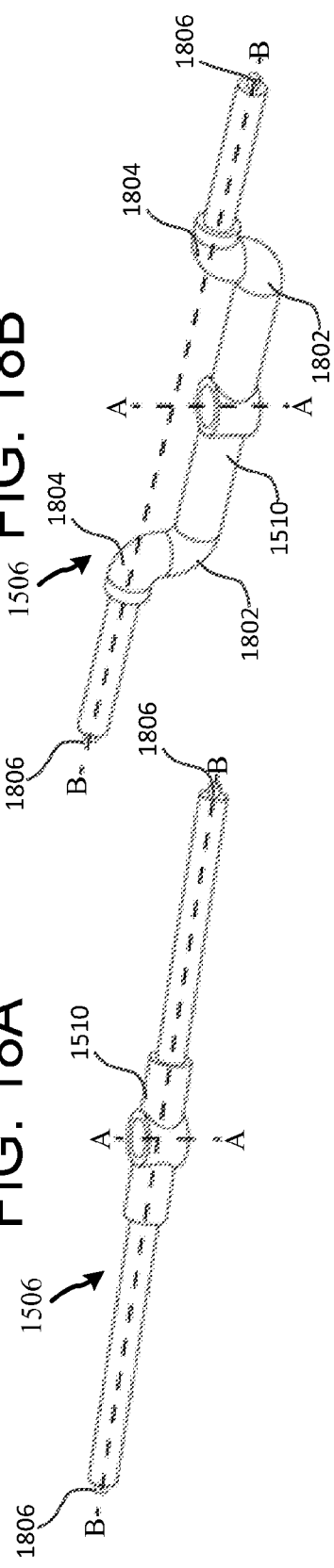
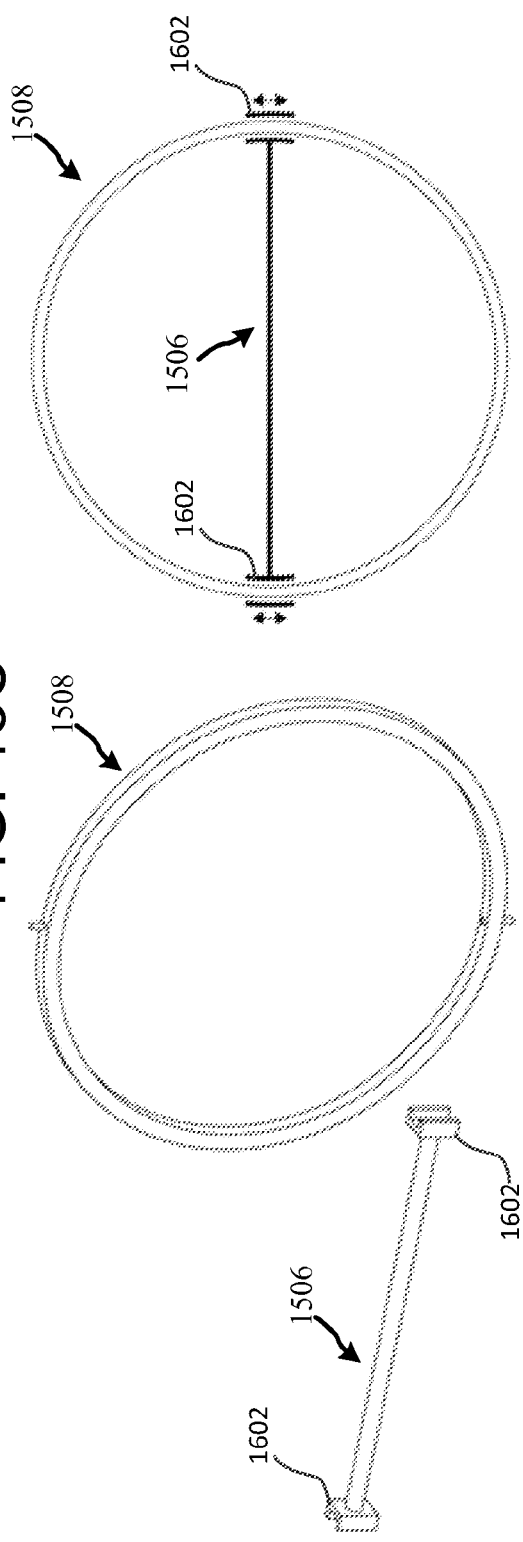

VERTICAL TAKE-OFF AND LANDING AERIAL VEHICLE

CROSS-REFERENCE TO RELATED APPLICATION DATA

This application is a Continuation-In-Part application of U.S. application Ser. No. 14/301,639 filed Jun. 11, 2014, which claims priority to EP application no. 13171364.6 filed on Jun. 11, 2013 and International Application No. PCT/EP14/62129 filed on Jun. 11, 2014, which are incorporated herein in their entireties.

TECHNICAL FIELD

The present invention concerns a vertical take-off and landing (VTOL) aerial vehicle.

BACKGROUND

VTOL aerial vehicles generally fly thanks to a propulsion system (e.g. one or more propellers) that generates an upward force (lift) to counter gravity. Such vehicles are capable of slow flight (hovering flight), vertical take-off or vertical landing, and have generally a control system to control their orientation or direction in order to stay in a stable orientation or to move sideways. When the aerial vehicle is not in a stable orientation, e.g. its propulsion system creates a force that is not pointing mostly upwards, the aerial vehicle can quickly lose lift, or gain speed towards the direction in which the propulsion system creates a force.

VTOL aerial vehicles that stay aloft using a propulsion system and a control system exist in several configurations known in the prior art. Examples of such VTOL aerial vehicles comprising a propulsion system and a control system are illustrated in FIG. 1(a) through FIG. 1(d) for reference (many more types exist but are not illustrated in the Figs.). The propulsion system usually comprises one or more propellers 101, and provides the lift force that keeps the aerial vehicle in the air. The control system can take various forms and usually comprises some control electronics 102 and possibly additional actuators not used to generate lift, but rather to generate forces or torques around the roll 110, pitch 111 or yaw 112 axis, in order to control the roll 113, pitch 114 and the yaw 115 motions, or in other words the aerial vehicle's orientation and thus the direction of the lift force. Such aerial vehicles stay in the air by remaining in an orientation where the propulsion system generates a force that is mostly upwards (usually by having the propellers rotate approximately in the horizontal plane), and they move sideways by slightly tilting.

FIG. 1(a) illustrates a multi-rotor system, and specifically a quadrotor is illustrated. Such an aerial vehicle uses a propulsion system comprising several horizontal propellers 101 generating lift. The control system determines the speed of each individual propeller to stabilize the aerial vehicle in a stable orientation or to tilt it so that it moves sideways. The differential actuation of opposite propellers generates torques around the pitch and roll axes. The differential actuation of propellers turning in opposite directions generates a torque around the yaw axis.

FIG. 1(b) illustrates a typical helicopter propulsion system. This aerial vehicle uses one main horizontal propeller 101 as a propulsion system to generate lift. The control system controls the pitch and roll motions of the aerial vehicle thanks to a swash-plate 104 that actuates the pitch of the main propeller's blades and stabilizes the pitch and roll of the aerial vehicle, or tilts it to move sideways. A vertical tail propeller 103 is used to control the yaw angle.

FIG. 1(c) illustrates a co-axial design with fly-bar. Such an aerial vehicle uses two horizontal propellers 101 rotating in opposite directions as a propulsion system. The control system comprises a fly-bar 105 that keeps the pitch and roll angles stable. The fly-bar is a rigid rod with a relatively high moment of inertia that rotates together with the top propeller and remains horizontal thanks to inertia. It is mechanically linked to the pitch of the upper propeller's blades so that when the aerial vehicle's orientation is disturbed, the propeller creates a torque that brings back the aerial vehicle in a stable orientation. The differential actuation of the two propellers allows control of the yaw angle. The lower propeller can be equipped with a swash-plate in order to control the pitch and roll motions, and thus move the aerial vehicle sideways.

FIG. 1(d) illustrates a co-axial design with control surfaces. This aerial vehicle uses two horizontal propellers 101 rotating in opposite directions as a propulsion system. The control system uses one pair of control surfaces 108 to control the pitch motion and another pair of control surfaces 106 to control the roll motion. The control surfaces are actuated by two actuators 107, and generate forces by deflecting the airflow generated by the propulsion system. The differential actuation of the two propellers allows control of the yaw angle.

Aerial vehicles designed to fly close to obstacles, such as disclosed in EP2517767A2 "Self-righting frame and aeronautical vehicle" to J. Dees and G. Yan, are often equipped with protective structures typically surrounding the propulsion system and control system. These protective structures prevent external objects from damaging sensitive parts such as rotating propellers or control surfaces, or absorb collision energy when the aerial vehicle collides into obstacles or falls to the ground. They are generally built so that openings allow the airflow to go through the structure without affecting too much the lift force generated by the propulsion system. The shape of the protective structures can be designed so that the aerial vehicle will upright passively to a vertical take-off orientation when it lies on flat ground.

A few existing VTOL aerial vehicles use protective structures with moving parts in order to improve the interaction with the environment. As described in M. Itasse, J.-M. Moschetta, Y. Ameho, and R. Can, "Equilibrium Transition Study for a Hybrid MAV," *International Journal of Micro Air Vehicles*, vol. 3, no. 4, pp. 229-246, December 2011, a dual-motor VTOL is equipped with two passively rotating wheels that both protect the rotors from contact, and can be used to roll on the ground or even along the wall when in flight. However, the wheels can only protect the inner frame of the aerial vehicle from touching flat obstacles, and the aerial vehicle can only roll toward a single direction.

In A. Kalantari, and M. Spenko, "Design and Experimental Validation of HyTAQ, a HybridTerrestrial and Aerial Quadrotor," *IEEE International Conference on Robotics and Automation*, 2013, a protective cage is described that can passively rotate around one axis and offers better protection, which allows the VTOL aerial vehicle to roll on uneven ground towards a single direction only. While these aerial vehicles demonstrate passively rotating protective structures for rolling on obstacles, their rolling direction is constrained to a single direction because of the single axis of rotation. Also, among other things, these mechanisms do not address the problem of reducing disturbances occurring from in-flight collisions with obstacles.

An aerial vehicle described in US2010/0224723A1, "Aerial Vehicle" to J. Apkarian, features a protective structure that can rotate around two different axes. However, the rotation axes are fully actuated and controlled at all time by motors. Among other things, the actively controlled rotation of the structure only allows the stabilization of the aerial vehicle during flight by changing the position of the center of mass of the protective structure. This design does not allow for disturbance reduction when colliding in flight with obstacles, or for rolling on obstacles (e.g. in contact with obstacles during flight).

U.S. Pat. No. 6,976,899 to Tamanas describes an "all terrain vehicle" comprised of three connected rings, a cradle attached to the innermost ring and configured such that the vehicle rolls upon the ground while the cradle remains upright. Among other things, while the all terrain vehicle is configured to travel over various ground surfaces, the all terrain vehicle is not configured and has no application as a vertical take-off and landing aerial vehicle.

When an aerial vehicle enters into contact with an obstacle, relatively large external torques and forces can disturb the orientation of the aerial vehicle. While an onboard control system (mechanical and/or software) might counter some amount of disturbances and bring back the aerial vehicle in a stable orientation for flying, such control systems are often unable to correct quickly the large disturbances occurring after a contact with external objects. Such contacts can thus provoke large perturbations of the aerial vehicle's orientation or trajectory, or even lead to a crash to the ground. Most aerial vehicles are thus always kept away from obstacles, to prevent any contact with obstacles. Additionally, most aerial vehicles can only take-off from one resting orientation, in which the propulsion system can create an upwards force, which limits their ability to take-off from uneven ground, or after landing in other orientations.

SUMMARY

The present disclosure describes a system that reduces the disturbances provoked by a contact with an external object, which allows aerial vehicles to collide with obstacles while remaining in a stable orientation most of the time. A vertical take-off and landing (VTOL) vehicle comprises an inner frame, a gimbal system or decoupling mechanism and an outer frame. The gimbal system allows the outer frame to passively rotate independently from the inner frame, which reduces the disturbances provoked by a contact with an external object, allows rolling on obstacles and allows take-off from any orientation. The VTOL according to the disclosure allows the platform to stay in contact with an obstacle, be it below, sideways, or above the platform, and move with respect to the obstacle while staying in contact with it, which is described herein as rolling on it. The VTOL is configured as an aerial vehicle that can take-off from any orientation, even on uneven ground.

The VTOL according to the present disclosure comprises a propulsion system and a control system, the propulsion system being able to generate a lift force, the control system being able to control the orientation of the inner frame, the gimbal system connecting the inner frame to the outer and inner frames, i.e. the outer frame with at least two rotation axis allowing rotation freedom between the outer frame to rotate independently from the inner frame.

The rotation axis are configured to decouple mechanically the outer frame from the inner frame with the gimbal system, so that the outer frame can rotate passively around the inner frame. The inner frame contains the propulsion system and control system that keep the aerial vehicle aloft by generating an upward force and rejecting small disturbances, while the outer frame prevents external objects from touching the inner frame and affecting its orientation. The outer frame is geometrically configured to withstand substantial impacts and protect the VTOL inner frame, propulsion and control systems so that the VTOL can re-stabilize after impacts and continue to travel. Different designs for the outer frame structure are disclosed that reduce the forces occurring during a collision with obstacles.

The gimbal system allows the outer frame to rotate passively around the inner frame about two or more rotation axes. Therefore some or all of the torques applied to the outer frame will provoke its rotation about these axes, but will not affect the inner frame, so that the propulsion system remains in a stable orientation for hovering flight. An aerial vehicle configured according to the disclosure can thus collide with obstacles while its inner frame remains in a stable orientation, which prevents large instabilities or crashes of the aerial vehicle from occurring when the propulsion system experiences significant orientation perturbations.

Further, since the orientation of the inner frame is not constrained when the outer frame is in contact with obstacles, the control system is still able to make the aerial vehicle move sideways, up or down while the outer frame remains in constant contact with obstacles. This allows the aerial vehicle to fly towards different directions while staying in contact with external objects, walls or ceilings (in other words: it is able to roll on obstacles while in flight).

The disclosed system is also useful for taking-off from any orientation: when on the ground, the inner frame can rotate freely inside the outer frame and a mechanism can thus rotate the inner frame to an orientation appropriate for take-off (e.g. with the propulsion able to generate an upwards force). The rotation of the inner frame can be accomplished by placing the center of mass of the inner frame so that the gravity pulls it in the desired orientation, or by using the control system of the inner frame.

The aerial vehicle (VTOL) may also include a decoupling mechanism comprised of a beam and a ring. The beam may be attached to a rotation joint to create a first rotation axis. The rotation joint may be configured to provide a second rotation axis substantially orthogonal to the first rotation axis. Additionally, the beam may have sliders at ends thereof that allow the ring to slide along the beam, creating a third rotation axis. The beam may be linear or non-linear depending upon implementation.

The inner frame described herein may be implemented within a coaxial rotor or quadrotor aerial vehicle. The propellers of the quadrotor may overlap one another so larger propellers may be used within needing to enlarge the size of the inner frame.

BRIEF DESCRIPTION OF THE FIGURES

The VTOL according to the disclosure will be better understood with reference to the accompanying figures, in which:

FIG. 3(a) illustrates an exploded view of each main component of an aerial vehicle according to the disclosure;

FIGS. 14(a) and 14(b) illustrate, respectively, an aerial vehicle according to the disclosure equipped with a gimbal system and tetrahedral bumpers protecting the outer frame wherein an inner frame comprises a coaxial design with control surfaces, and wherein an inner frame comprises a multi-rotor;

FIG. 17 illustrates a perspective view of an aerial vehicle having a decoupling mechanism including the beam, with a propulsion system comprising a coaxial propeller configuration;

FIG. 18(a) illustrates a perspective view of the decoupling mechanism linear beam;

FIG. 18(b) illustrates a perspective view of the decoupling mechanism non-linear beam;

FIG. 18(c) illustrates an exploded view of the decoupling mechanism configuration including the beam having sliders and the ring;

DETAILED DESCRIPTION

In a first embodiment the present disclosure concerns a VTOL (vertical take-off and landing) aerial vehicle comprising an inner frame, a gimbal system and an outer frame. The gimbal system acting as a decoupling mechanism reduces the disturbances provoked by a contact with an external object, allows rolling on obstacles and allows take-off from any orientation.

Only very little can be found in the literature about the analysis of collisions between aerial vehicles and external objects. Since the present disclosure concerns a system to reduce the disturbances from collisions, it is important to understand them. Typically, it is interesting to know how the aerial vehicle's linear and angular speeds are affected after an impact. A model developed in R. Cross, "Measurements of the horizontal coefficient of restitution for a superball and a tennis ball," *American Journal of Physics*, vol. 70, no. 5, p. 482, 2002, which is incorporated by reference herein in its entirety, describes the collisions of semi-elastic balls onto various types of surfaces, and can be adapted as described hereinafter to the case of aerial vehicles according to the disclosure after making certain assumptions.

Figure 1A:
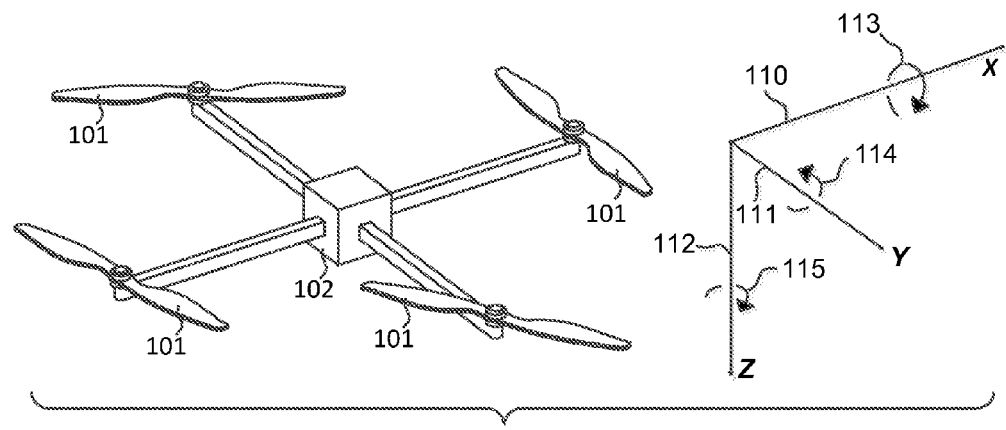
FIGS. 1(a)-1(d) illustrate various prior art propulsion systems for VTOL aerial vehicles.
Figure 1B:
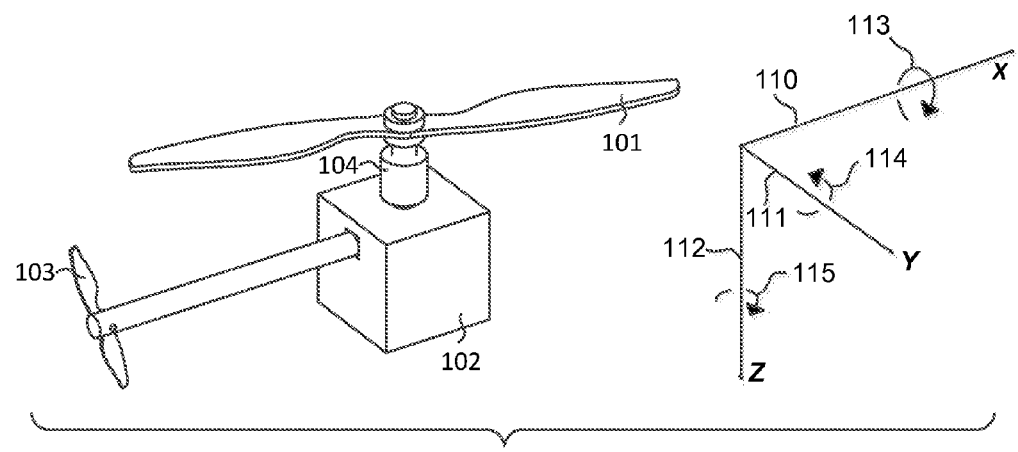
Figure 1C:
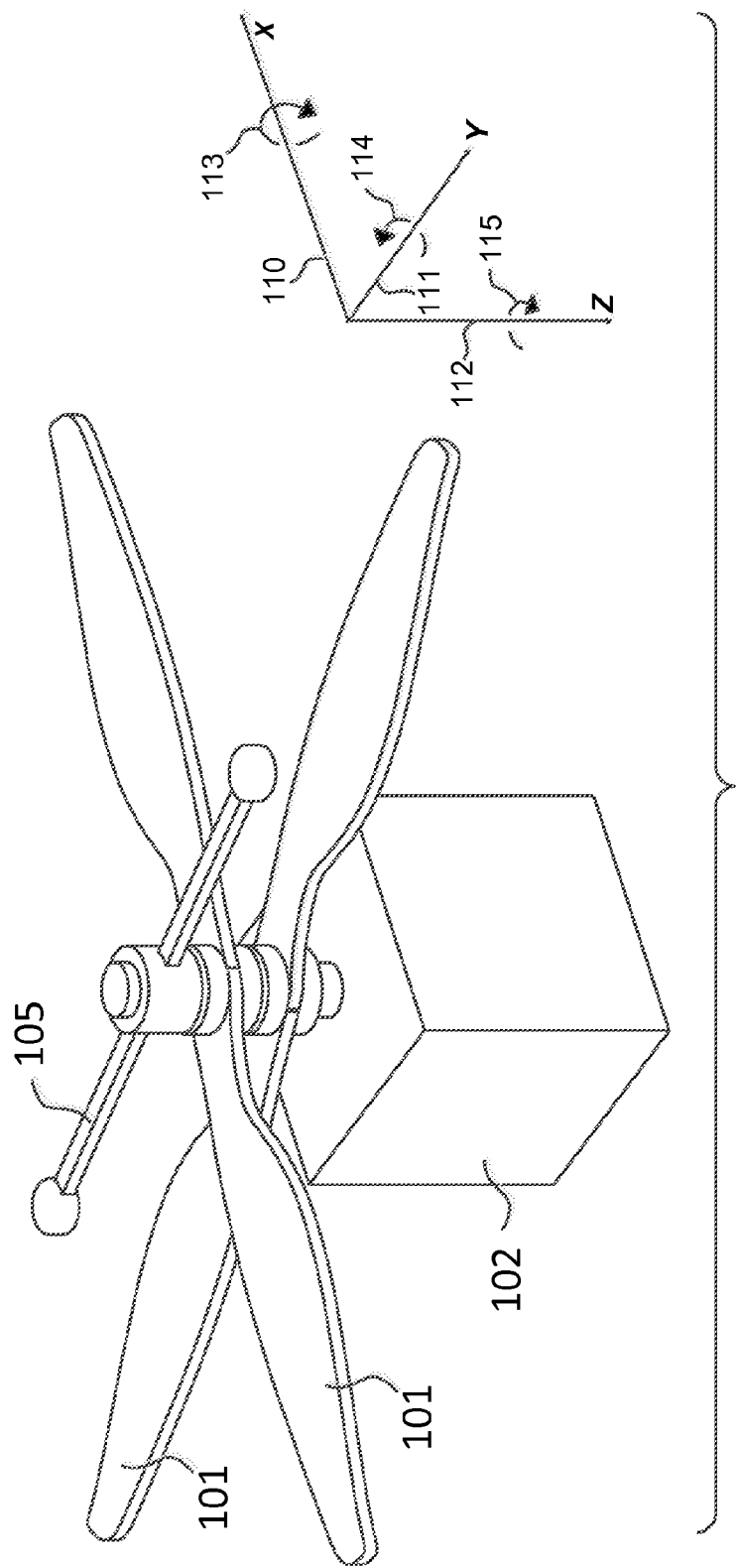
Figure 1D:
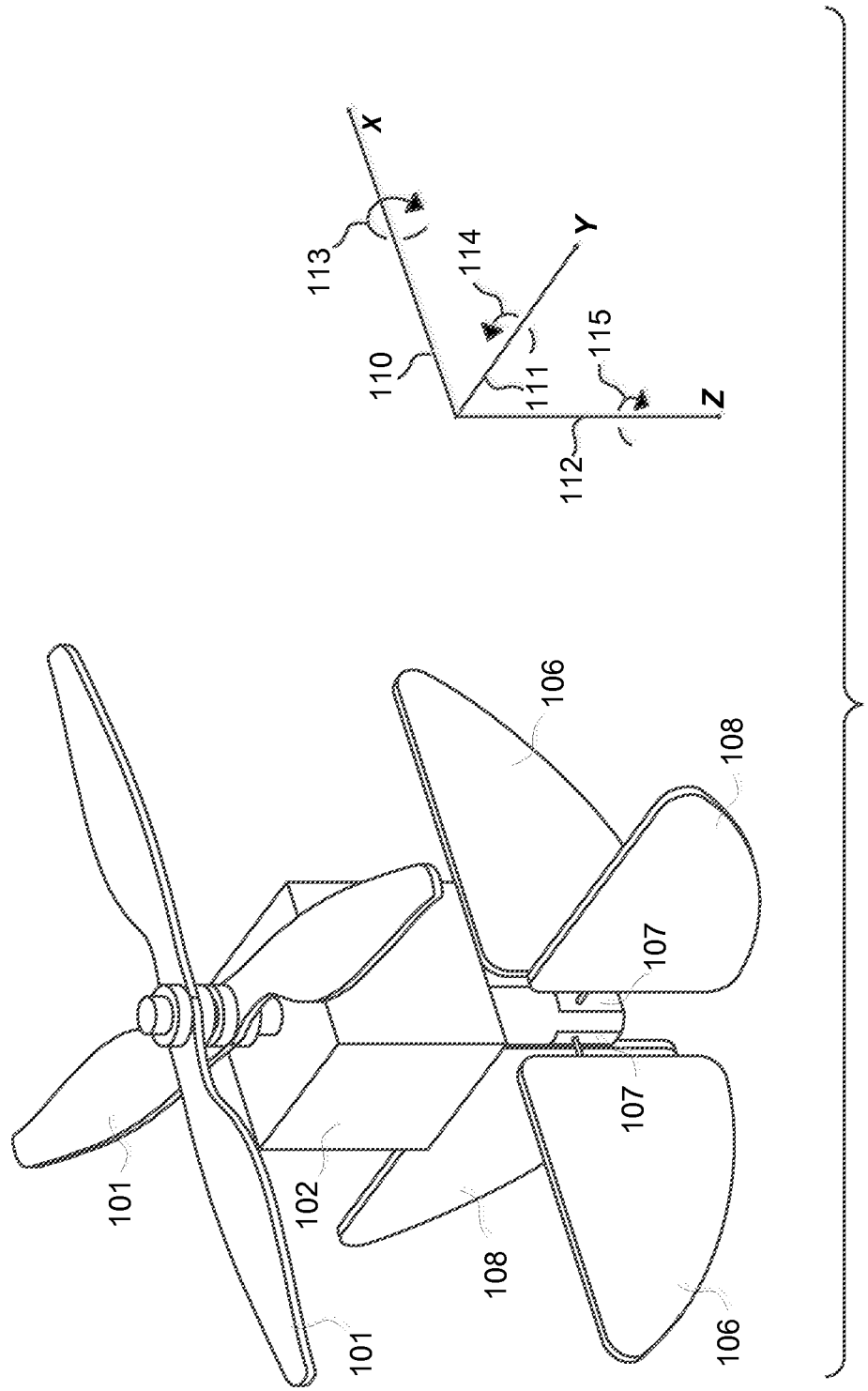
Figure 2A:
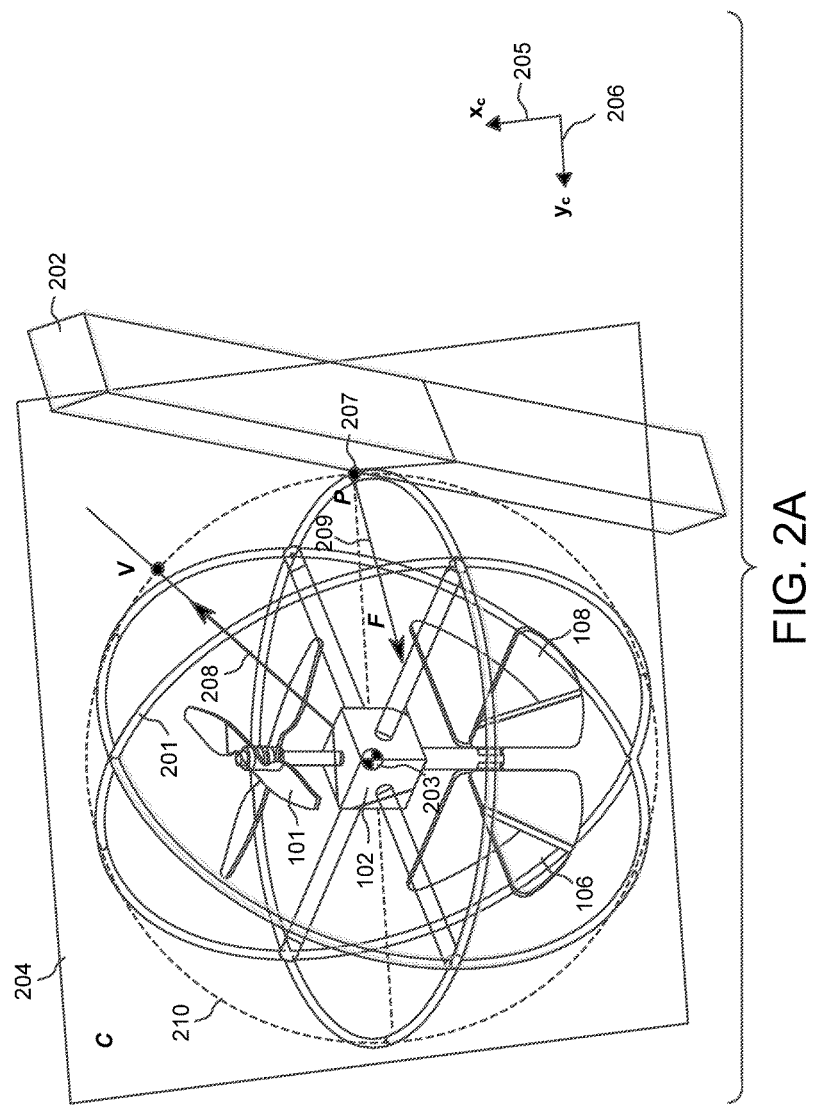
FIG. 2(a) illustrates an aerial vehicle according to the disclosure equipped with a protective frame rigidly attached to the control and propulsion system colliding into a beam.
Figure 2B:
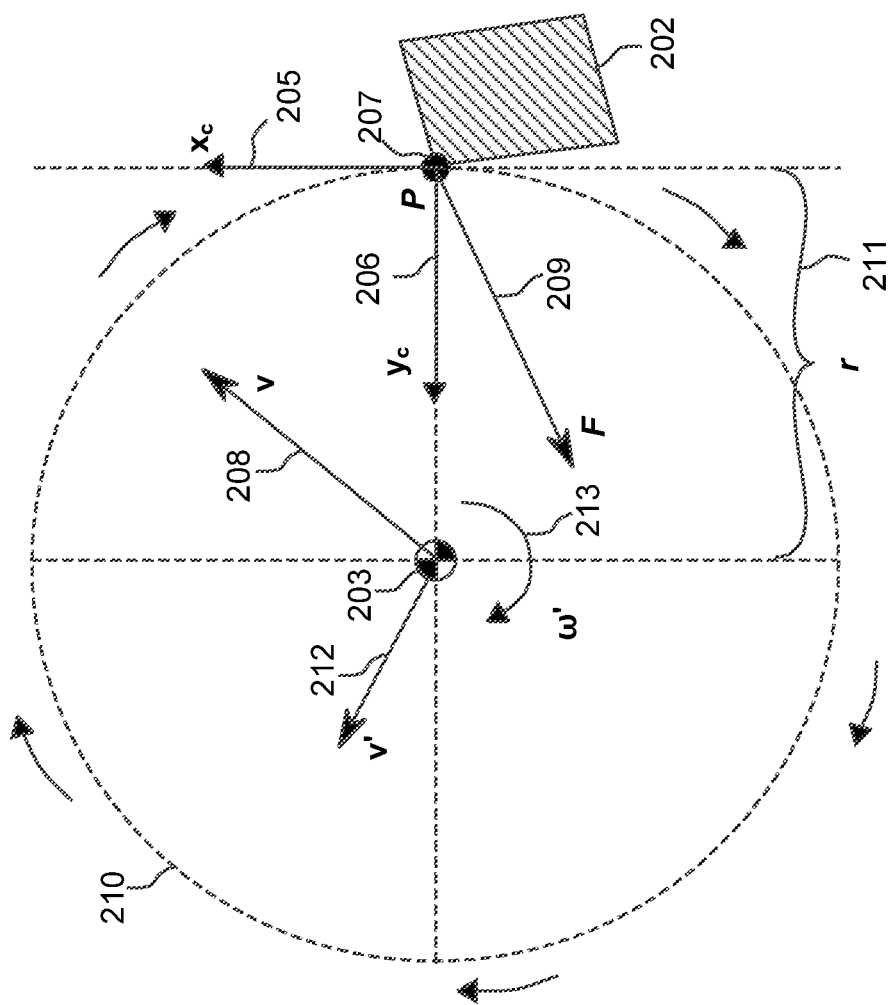
FIG. 2(b) illustrates a 2D representation of the aerial vehicle of FIG. 2(a) on the collision plane.

Referring now to FIGS. 2(a) and 2(b), the instantaneous linear and angular speeds just before and just after the impact are studied. The case with a null angular speed just before the impact is considered for simplification reasons. It is assumed that there is only one contact point between the aerial vehicle and the external obstacle. Also, it is assumed that no other significant force than the contact force is applied on the aerial vehicle during the impact, in other words, the linear and angular accelerations generated by the propulsion and stabilization systems during the collision are considered to be negligible compared to the impact force. Finally, it is assumed that the collision can be studied in two dimensions on the collision plane C 204, which is defined as containing the contact point P 207 and the initial velocity vector v 208 whose origin is at the center of mass (COM) 203. FIG. 2(a) shows an aerial vehicle equipped with a protective frame 201 colliding with an external object (beam) 202 at point P, and the collision plane 204 containing both P 207 and v 208. The force F 209 is the average force applied by the external object on the aerial vehicle during the impact and is assumed to be contained in C.

In the illustration of FIG. 2(*a*) the aerial vehicle is equipped with a protective frame 201 rigidly attached to the control and propulsion system colliding into the beam 202. The collision plane 204 is defined as containing the contact point P 207 and the initial velocity vector v 208 whose origin is at the center of mass (COM) 203. FIG. 2(*b*) illustrates a 2D representation of the aerial vehicle on the collision plane, whose coordinate system is defined with the origin at the contact point P and the V axis 206 pointing toward the COM. The X axis 205 is called the parallel or horizontal axis, and the V axis the perpendicular or vertical axis. The distance between the contact point P and the COM is r 211. The protective structure of the aerial vehicle is pictured as a circle 210, but could be of any shape, just implying a variable r depending on the position of the contact point. The velocity v' 212 and rotational velocity w' 213 just after the collision are shown. The velocity after the impact v' 212 is assumed to be contained in C and the angular speed vector after the impact ω' is assumed to be normal to C (only the rotation direction is pictured in 213).

A collision of an aerial vehicle with an external obstacle can have very different outcomes, depending on the elasticity of the protective structure of the aerial vehicle, the friction with the obstacle, the rigidity of the obstacle, etc. Typically, the contact force will make the aerial vehicle bounce away from the obstacle to some extent depending on the elasticity of the protective structure and the rigidity of the obstacle. While this disturbs the trajectory of the aerial vehicle, the biggest disturbance is the torque applied to the center of mass of the aerial vehicle, because it might reach an unstable orientation where the propulsion system is not generating a mostly upwards force anymore. Typically, if the initial velocity is not pointing towards the point of impact and the contact is not frictionless, the collision force at the point of impact generates a torque and thus provokes a certain amount of spin of the aerial vehicle depending on the friction between the protective structure and the obstacle.

While the dynamics of the interaction occurring during the impact are quite complicated and involve slipping, gripping or bouncing, the details can be ignored thanks to the introduction of two coefficients of restitution (COR), $e_x$ and $e_y$:

$$e_y = -\frac{v'_y}{v_y} \quad (1)$$

$$e_x = -\frac{v'_x - r\omega'}{v_x} \quad (2)$$

The vertical COR $e_y$ can vary between 0 and 1 and describes the amount of elasticity in the protective structure and external obstacle, and allows to determine how fast the aerial vehicle bounces off away from the obstacle. If $e_y$ is equal to 1, the collision is fully elastic and the aerial vehicle will bounce off the wall with a reversed sign for the perpendicular speed while if $e_y$ is equal to 0, the aerial vehicle will stay against the wall. The horizontal COR $e_x$ can vary between −1 and 1 and describes the amount of friction between the protective structure and the external obstacle, as well as some elasticity, and allows to determine how much spin is given to the aerial vehicle. If $e_x$ is equal to −1, it simulates a frictionless contact which doesn't generate any spin. If $e_x$ is equal to 0, it simulates a contact where the aerial vehicle grips to the surfaces and the contact point comes to a rest, thus provoking a spin $$\omega' = \frac{v'_y}{r}.$$

If $e_x$ is equal to 1, the contact point bounces back with opposite speed which provokes an even larger spin. While these coefficients are hard to obtain and vary from situation to situation, they allow to take a generic approach and generally don't need to be obtained to make most discussion points.

The velocity just after the impact v', the angular speed just after the impact w' and the average contact force during the impact F can then be obtained knowing the velocity v just before the impact thanks to Newton's second law as such:

$$\omega' = v_x \frac{1}{r} \frac{(e_x + 1)}{(\alpha + 1)} \quad (3)$$

$$v'_x = v_x \frac{1 - \alpha e_x}{\alpha + 1} \quad (4)$$

$$v'_y = -e_y v_y \quad (5)$$

$$F_x = -\frac{m v_x}{\Delta t} \frac{\alpha}{\alpha + 1}(e_x + 1) \quad (6)$$

$$F_y = -\frac{m v_y}{\Delta t}(e_y + 1) \quad (7)$$

Where $$\alpha = \frac{I}{mr^2}$$

is a scaleless parameter that describes the mass distribution of the aerial vehicle and is likely to be between 0.3 and 0.5 for conventional aerial vehicles of any size. I is the moment of inertia of the aerial vehicle about the axis normal to the collision plane at the center of mass 203, m is the mass of the aerial vehicle, r 211 is the distance between the contact point P 207 and the center of mass, and Δt is the duration of the impact.

It is interesting to note that w' 213 scales inversely proportionally to r which means that for similar aerial vehicles of different sizes colliding at the same speed with an external object, the rotation speed after a collision is larger for smaller aerial vehicles.

Also, the higher the moment of inertia I, the higher $F_x$ will be and the smaller $v_x'$ will be, meaning that for high moments of inertia, the aerial vehicle will experience a higher force and be slowed down more in the direction along the Y axis. Inversely, a lower moment of inertia reduces the friction force $F_x$ which means the speed and aerial vehicle's trajectory will not be affected as much by the collision.

In case of frictionless collision ($e_x = -1$), the rotational speed just after the impact w' is zero, as well as the friction force $F_x$.

An aerial vehicle according to the disclosure comprises an outer frame decoupled mechanically from an inner frame with a gimbal system, so that the outer frame can rotate passively around the inner frame. The inner frame contains the propulsion system and control system (for example one of those pictured in FIG. 1) that keep the aerial vehicle aloft by generating an upward force and rejecting small disturbances, while the outer frame prevents external objects from touching the inner frame and affecting its orientation. The gimbal system allows the outer frame to rotate passively around the inner frame about one or more rotation axes and it does not need to be actively actuated or controlled (e.g. with motors).

Figure 3B:
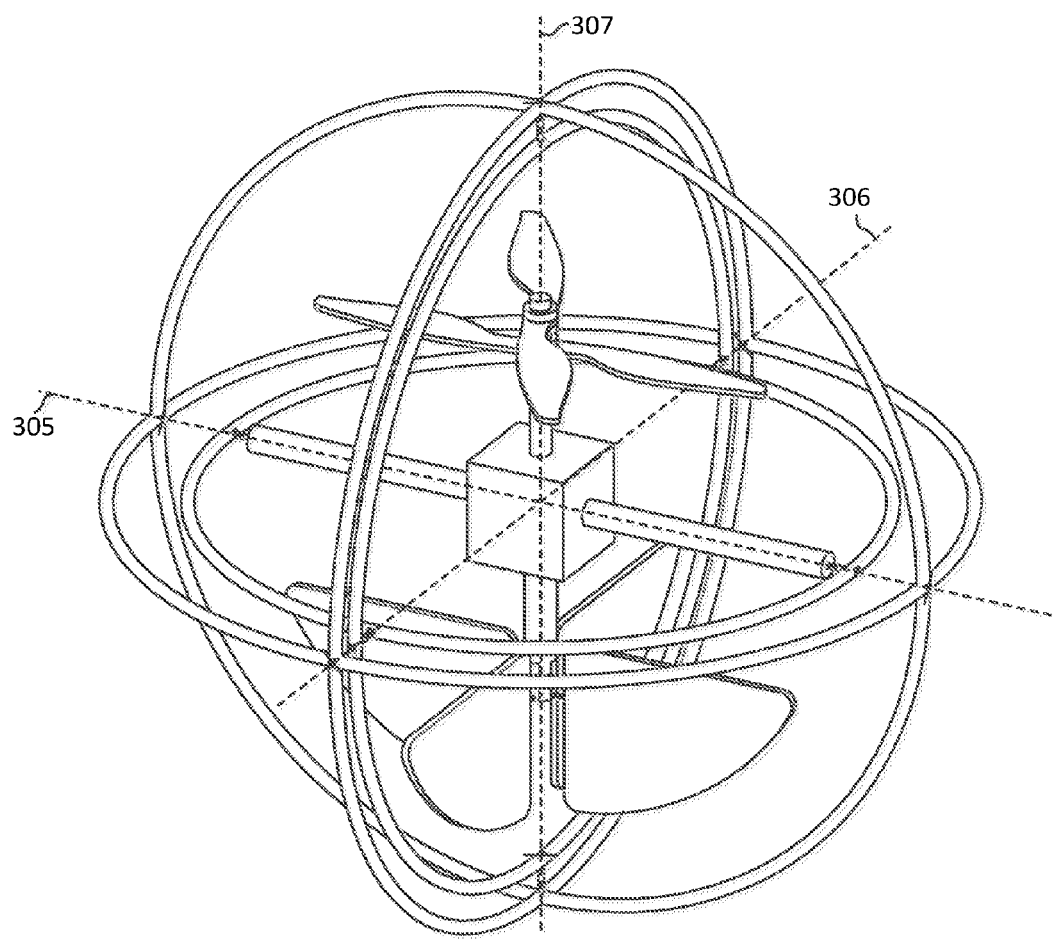
FIG. 3(b) illustrates an embodiment of an aerial vehicle according to the disclosure equipped with a gimbal system allowing the outer frame to rotate according to three rotation axes.

FIGS. 3(a) and 3(b) illustrate each main component of an aerial vehicle according to the disclosure comprising an inner frame 312, a gimbal system 301 and an outer frame 304, as well as the final assembly. The inner frame 312 comprising the propulsion and control systems are assembled inside two gimbals 302 and 303, around which the outer frame 304 is mounted. The outer frame can rotate passively and freely around the inner frame around each of the 3 rotation axes 305, 306 and 307. The propulsion and control systems comprised in the inner frame could be of any type (for example one of those pictured in FIG. 1) and not necessarily the one pictured. Also, the outer frame can be any type of protective structure and not necessarily the one pictured.

A mechanism using two gimbals allowing for three degrees of rotation freedom is illustrated in FIGS. 3(a) and 3(b). The gimbal system 301 is comprised of three rotation axes 305, 306 and 307, three pairs of rotation joints 309, 310 and 311 and two gimbals 302 and 303. The first rotation axis 305 is created by the first pair of rotation joints 309, with each joint 309 aligned with each other and fixed in a position on opposite sides of the inner frame at the fixation points 313. The first pair of rotation joints 309 is also fixed in a position on opposite sides of the first gimbal 302. The second rotation axis 306 is created perpendicular to the first rotation axis 305 by the second pair of rotation joints 310, with each joint 310 aligned and fixed in a position on opposite sides of the first gimbal 302 and fixed in a position on opposite sides of the second gimbal 303 so the second rotation axis 306 is perpendicular to the first rotation axis 305. The third rotation axis 307 is created by the third pair of rotation joints 311, with each joint aligned and fixed in a position on opposite sides of the second gimbal 303 and on opposite sides of the outer frame 304 at fixation points 314 so the third rotation axis 307 is perpendicular to the second rotation axis 306. The rotation joints are mechanical parts allowing for full rotation between the two parts interfaced at the joint.

Figure 4:
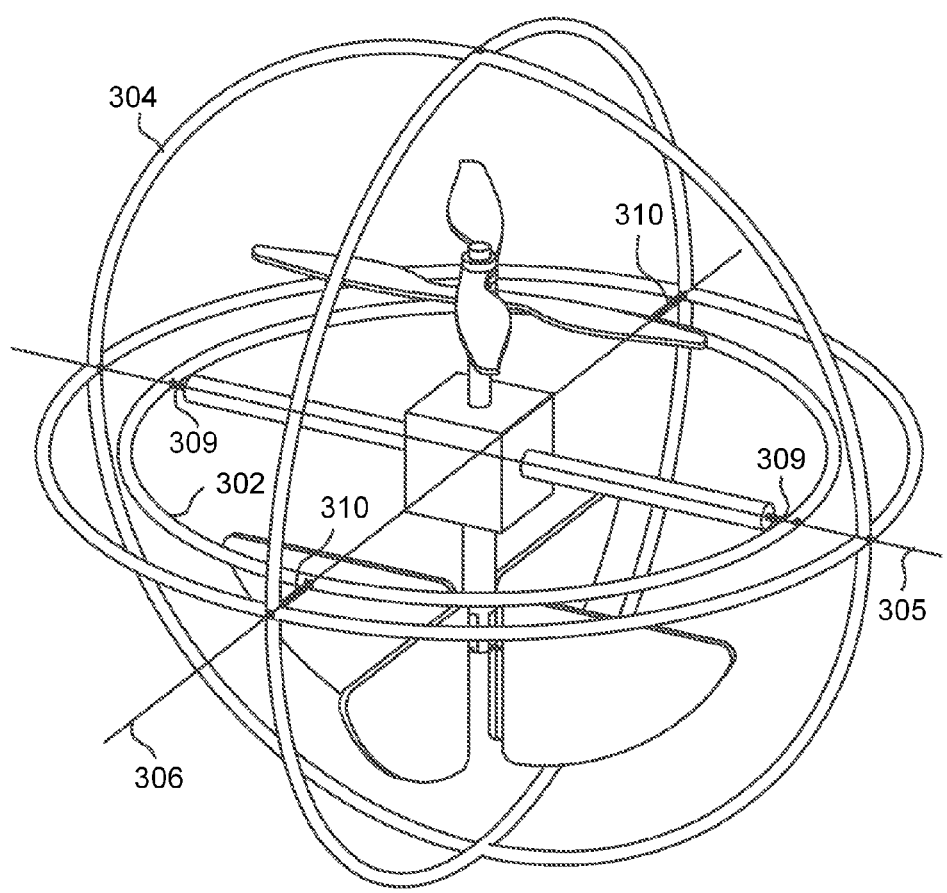
FIG. 4 illustrates an embodiment of an aerial vehicle according to the disclosure equipped with a gimbal system allowing the outer frame to rotate according to two rotation axes.

An embodiment of an aerial vehicle equipped with one gimbal allowing for two degrees of rotation freedom is shown in FIG. 4. This embodiment is particularly appropriate when the two rotation axes can be maintained in the horizontal plane before collisions (for example with one of the mechanisms presented further), so that the only constrained axis is around the yaw axis, around which the inner frame can rotate without severely affecting the stability of the platform, as disturbances in roll and pitch are the most serious for stability. In FIG. 4, an embodiment of an aerial vehicle is illustrated equipped with a gimbal system allowing the outer frame to rotate according to two rotation axes 305 and 306. The gimbal system uses one gimbal 302, and two pairs of rotation joints 309 and 310.

Reducing the Disturbances from Contacts with External Objects

Figure 5A:
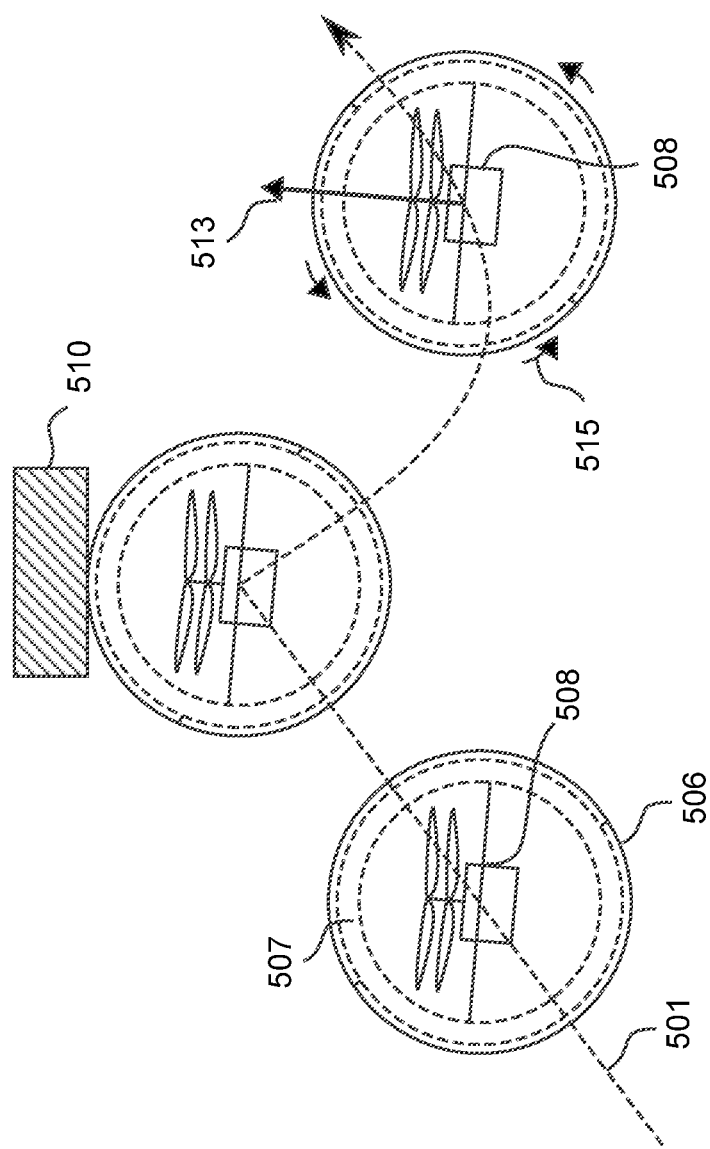
FIGS. 5(a) and 5(b) illustrate a side view of two situations where an aerial vehicle according to the disclosure collides with an external object.
Figure 5B:
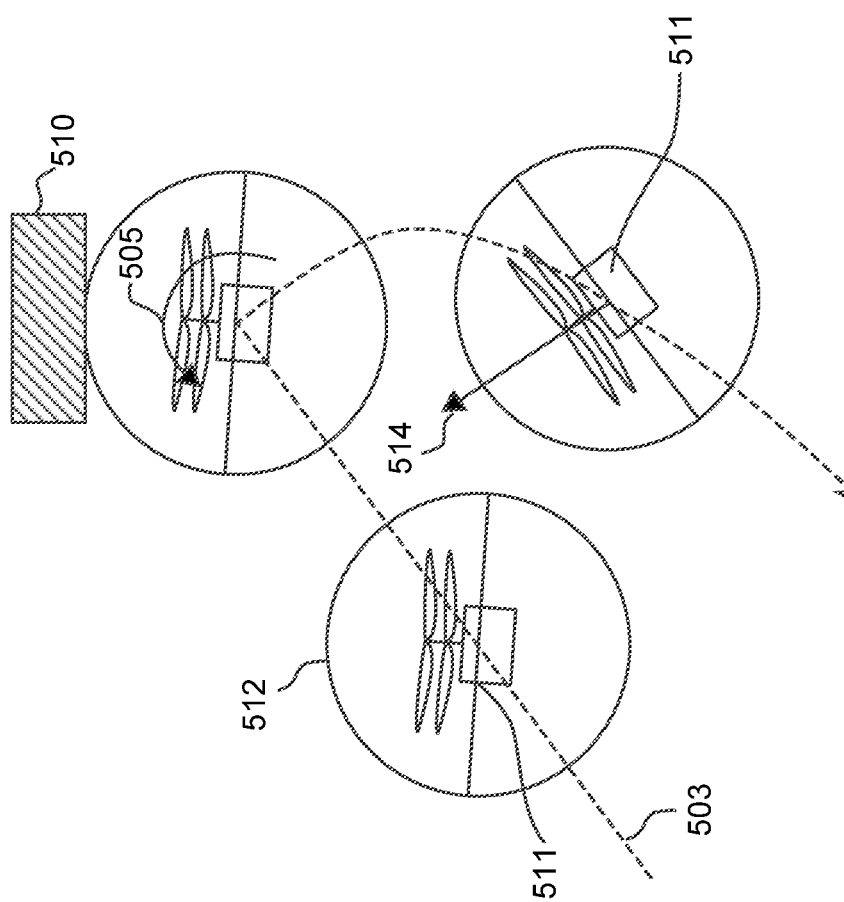

On conventional aerial vehicles, the protective structure (if it exists) is rigidly attached to the propulsion and control systems. The contact with an external object will thus generate a torque and thus a rotation of the entire aerial vehicle, including the propulsion system, according to equation (3) above. This might have as strong impact on the ability of the aerial vehicle to remain stable in the air because the propulsion system might not generate a mostly upwards force anymore, and rather propel the aerial vehicle sideways while it loses altitude. However, decoupling the inner frame from the outer frame with a gimbal system allows the inner frame to remain independent of the rotation of the outer frame. The contact with an external object will thus generate a rotation of the outer frame, while the inner frame and the propulsion system remain in a stable orientation. FIGS. 5(a(and 5(b) show an example of a collision with an external obstacle 510, illustrating the differences between an aerial vehicle equipped with a gimbal system in FIG. 5(a) and a conventional aerial vehicle illustrated in FIG. 5(b). While FIGS. 5(a) and 5(b) show an example in 2 dimensions, the principle is the same in 3 dimensions for contacts anywhere on the outer frame.

FIGS. 5(a) and 5(b) illustrate a side view of two situations where an aerial vehicle collides with an external object. In FIG. 5(a) an example trajectory 501 is illustrated, of an aerial vehicle equipped with a gimbal system 507 decoupling the rotation of the outer frame 506 from the inner frame 508 and colliding with an obstacle 510. The aerial vehicle bounces off the obstacle because of the elasticity of the impact and is thus slightly diverted from its original trajectory. The outer frame 506 gains some angular speed 515 after the impact, but the inner frame 508 containing the propulsion and control systems stays in its original orientation, in which the propulsion system generates a lift force 513 mostly pointing upwards, and the aerial vehicle can thus continue towards the intended direction. FIG. 5(b) illustrates an example trajectory 503 of a conventional aerial vehicle, whose control and propulsion systems 511 are rigidly connected to a protective frame 512, colliding with an obstacle 510. The impact generates a torque 505 that rotates the aerial vehicle into an orientation in which the propulsion system generates a force 514 that is not pointing mostly upwards. The aerial vehicle thus loses lift and goes in the direction towards which the propulsion system is generating a force. In most situations, the control system is not able to stabilize the orientation of the aerial vehicle fast enough, which provokes a large perturbation in the trajectory, or even a crash to the ground. Assuming a gimbal system with no friction in the rotation joints comprising gimbals of negligible moment of inertia, only the moment of inertia of the outer frame needs to be considered in equations (3-7), since only the outer frame is rotating after a collision. This reduction of moment of inertia implies that the force F applied to the aerial vehicle is reduced and the aerial vehicle equipped with a gimbal system is not slowed down as much as a conventional aerial vehicle after a collision. The gimbal system thus helps not only to reduce the torque applied to the inner frame by external objects, but the force as well, thus helping the aerial vehicle go towards its intended direction without being slowed down as much.

Figure 6:
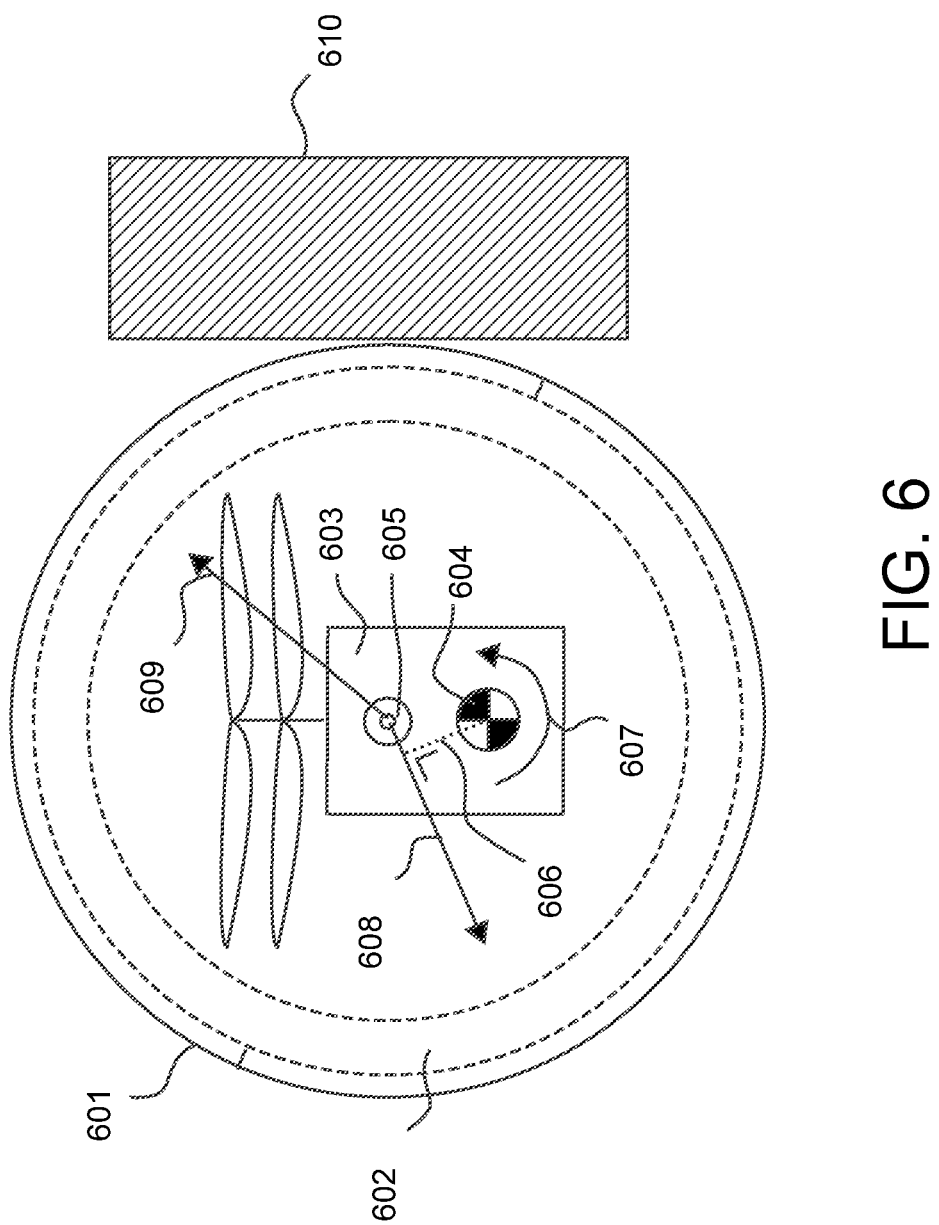
FIG. 6 illustrates a side view of the aerial vehicle equipped with a gimbal system according to the disclosure colliding with an obstacle.

As illustrated in FIG. 6, the force F applied by the external object on the outer frame 601 of an aerial vehicle flying at speed v 609 equipped with a gimbal system 602 is transmitted to the inner frame 603 through each axis described in FIGS. 3(a) and 3(b), and the force vector F 608 has its origin at the crossing 605 of the rotation axes. If the center of mass of the inner frame 604 is misaligned with one or more of the axes, the center of mass experiences a torque $\tau = F \cdot d$ 607, with d 606 the distance between the force vector and the COM. To reduce the torque in order to minimize the disturbances affecting the inner frame's orientation, the COM should be aligned with all of the gimbal system's axes. In FIGS. 3(a) and 3(b), the COM should thus be at the crossing of the 3 axes.

FIG. 6 illustrates a side view of the aerial vehicle equipped with a gimbal system 602 colliding with an obstacle 610. The torque 607 generated at the center of mass 604 of the inner frame due to misalignment of the COM with respect to the gimbal system's rotation axes' crossing point 605 is pictured. The force 608 applied by the external object on the aerial vehicle equipped with a gimbal system is applied to the inner frame through the rotation axes of the gimbal system. The torque is proportional to the lever arm d 606, the distance between the force vector and the COM. To reduce the torque, d should be minimized.

After an impact, the outer frame rotates at an angular speed defined by equation (3), with a rotation axis perpendicular to the collision plane. The rotation of the outer frame lasts indefinitely if there is no friction in the passive joints of the gimbal system. If the COM of the outer frame is misaligned with respect to the crossing of the gimbal system's axes, rotation of the outer frame will generate a centrifugal force which might disturb the inner frame. This disturbance can thus be minimized by aligning the COM of the outer frame with the crossing of the gimbal system's rotation axes.

When two axes of a gimbal system are aligned with each other, it loses a degree of freedom, and the inner frame is not fully decoupled from the outer frame anymore. This situation, called a gimbal lock, might prevent the gimbal system from reducing the disturbances from a contact with an external object, especially if a rotation axis in the horizontal plane is lost, as the pitch and roll axes are the most critical for keeping the lift force produced by the propulsion system mostly upwards. Solutions to this problem include: adding a gimbal or degree of freedom and/or actuating some gimbals to control their position away from a gimbal lock, adding repulsive or attractive elements like magnets in order to favor the position of the gimbals away from a gimbal lock. If using actuators, these should be reversible or capable of being turned off so that they allow free rotation with low friction when a collision happens.

Figure 7:
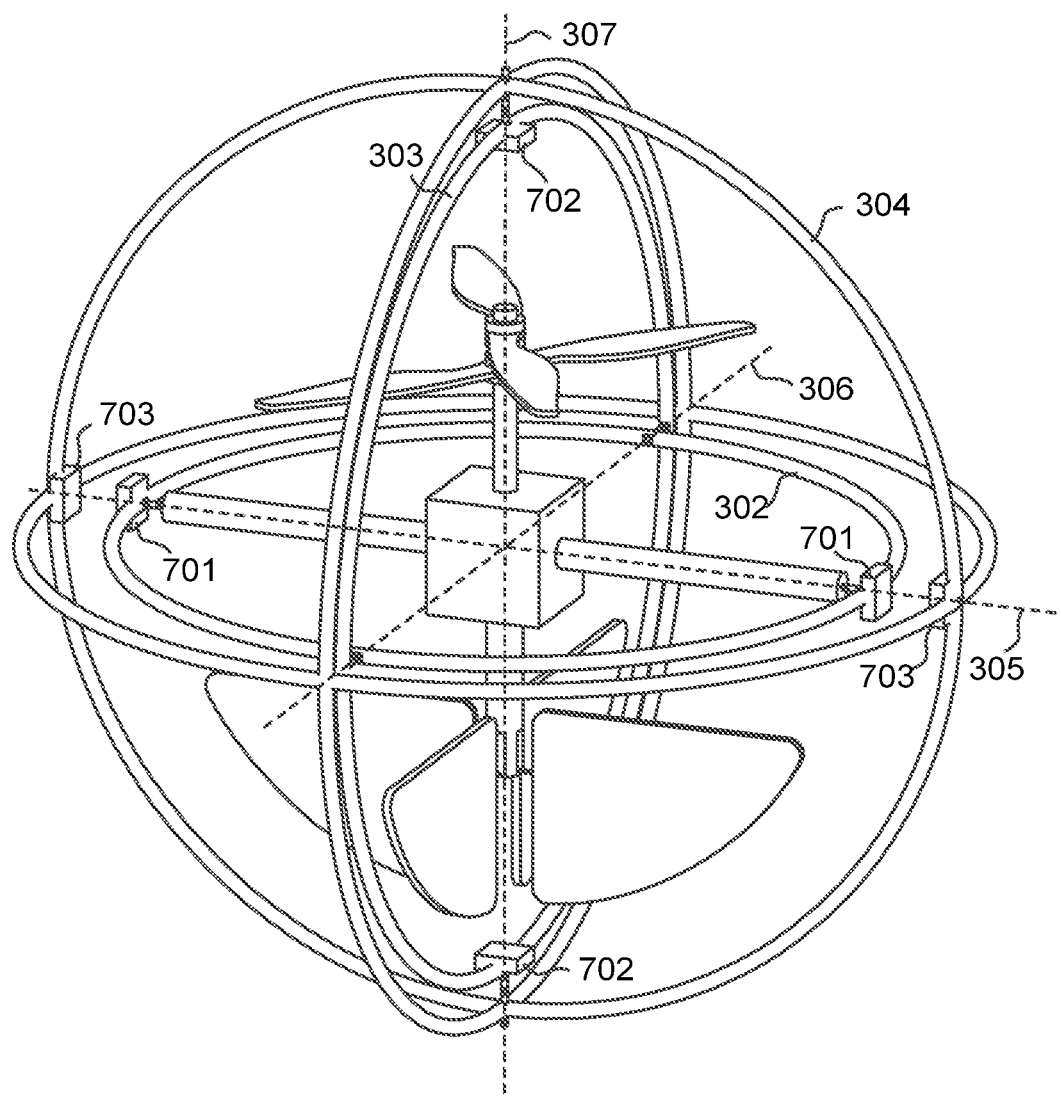
FIG. 7 illustrates an embodiment of an aerial vehicle according to the disclosure equipped with a gimbal system and magnets to prevent the gimbals from reaching a gimbal lock position.

An embodiment illustrated in FIG. 7 shows an aerial vehicle equipped according to the disclosure with a gimbal system whose gimbals 302 and 303 and outer frame 304 are equipped with magnets 701 to 703 to prevent the gimbals from reaching a gimbal lock position and/or to favor a certain relative orientation between the inner frame and the outer frame. In the embodiment, a disposition of magnets is illustrated, where a pair of magnets 701 is fixed to the first gimbal 302, and another pair of magnets 702 is fixed to the second gimbal 303. The north and south poles of magnets 701 and 702 are oriented so that they repulse each other, thus preventing the first and second gimbals to be in the same plane in the gimbal lock situation. In order to favor a certain relative orientation of the outer frame with respect to the inner frame, other magnets 703 can be fixed to the outer frame 304 so they are attracted to magnets 701. The attraction should be tuned so the outer frame is sufficiently free to rotate in case of a contact with an external object to keep the torque on the inner frame low.

Figure 8:
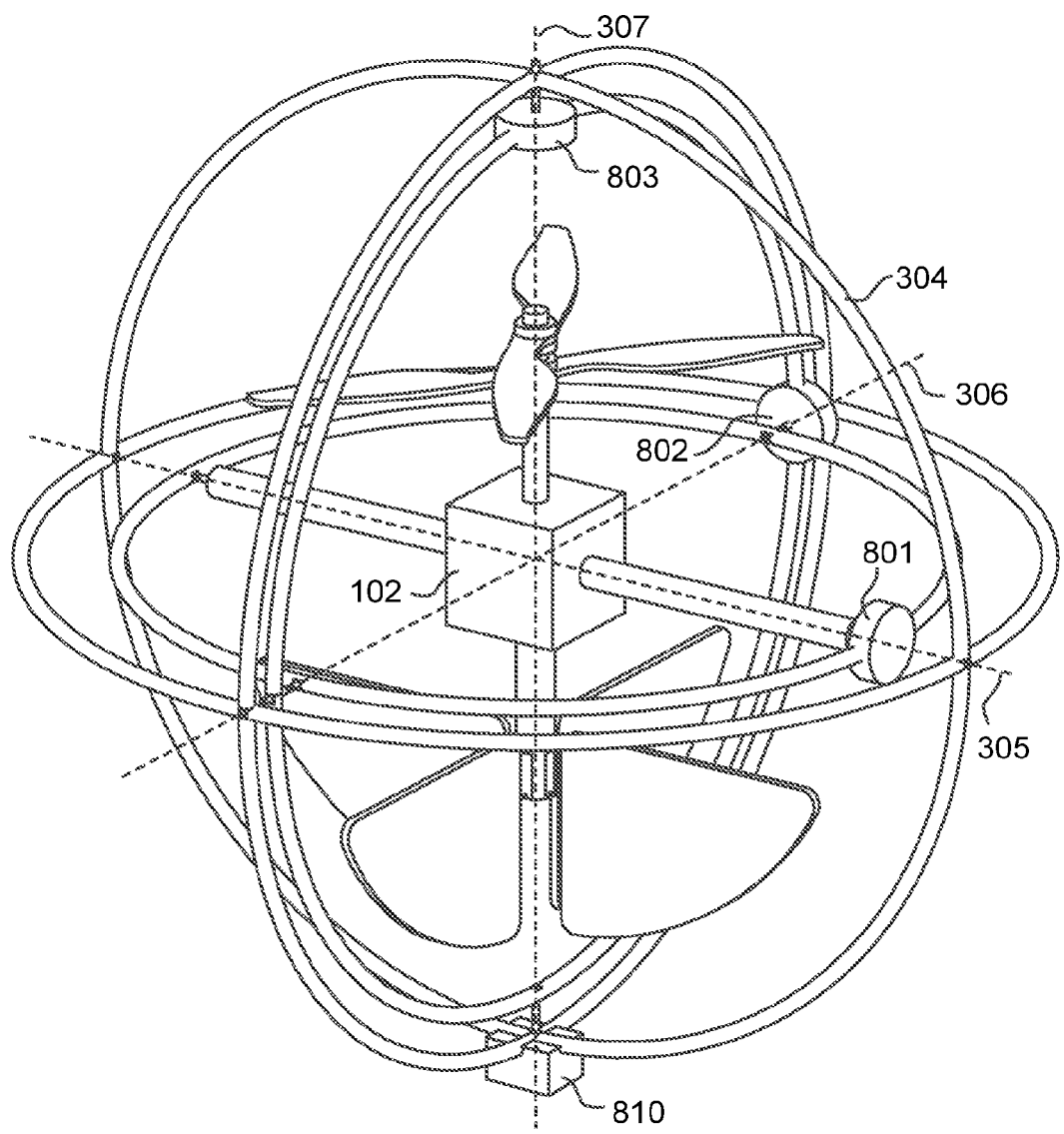
FIG. 8 illustrates an embodiment of an aerial vehicle according to the disclosure equipped with a gimbal system and actuators.

An embodiment illustrated in FIG. 8 shows an aerial vehicle equipped with a gimbal system and actuators 801, 802 and 803 to control the rotation of the three rotation axes 305, 306 and 307 respectively. The outer frame is equipped with an orientation sensor 810 as well as the control electronics 102, which allows measurement of the relative orientation between the outer frame and the inner frame. The first actuator 801 can actuate the rotation of the first rotation axis 305, the second actuator 802 can actuate the rotation of the second rotation axis 306 and the third actuator 803 can actuate the rotation of the third rotation axis 307. In order to know the relative orientation between the outer frame and the inner frame, an orientation sensor 810 (e.g. an IMU) can be fixed to the outer frame and another orientation sensor can be included in the control electronics 102, and the relative orientation can be obtained by correlating the signals from the two orientation sensors. Knowing the relative orientation of the outer frame with respect to the inner frame allows knowing the position of each gimbal, and thus allows generating adequate commands for the actuators.

Rolling on Obstacles

Figure 9:
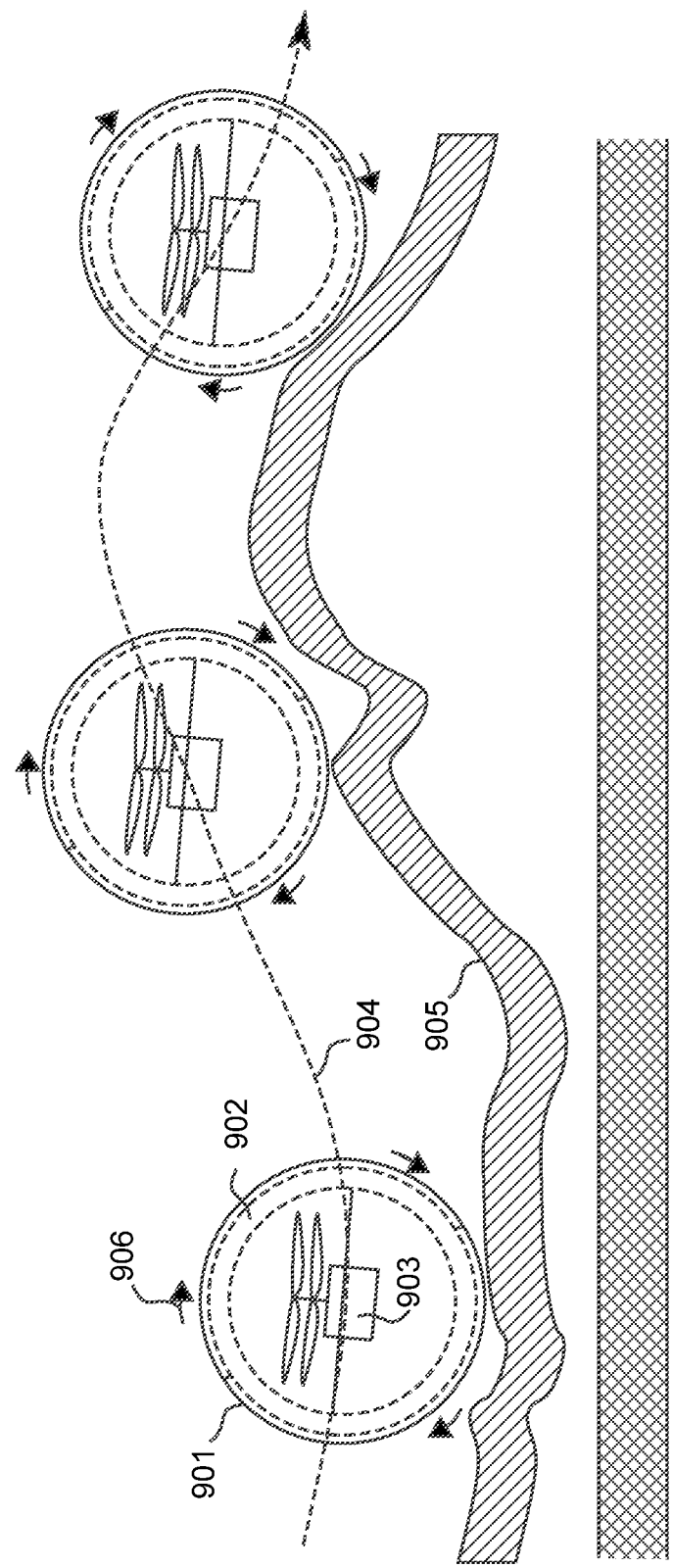
FIG. 9 illustrates a side-view of an aerial vehicle according to the disclosure equipped with a gimbal system that rolls on uneven ground.
Figure 10:
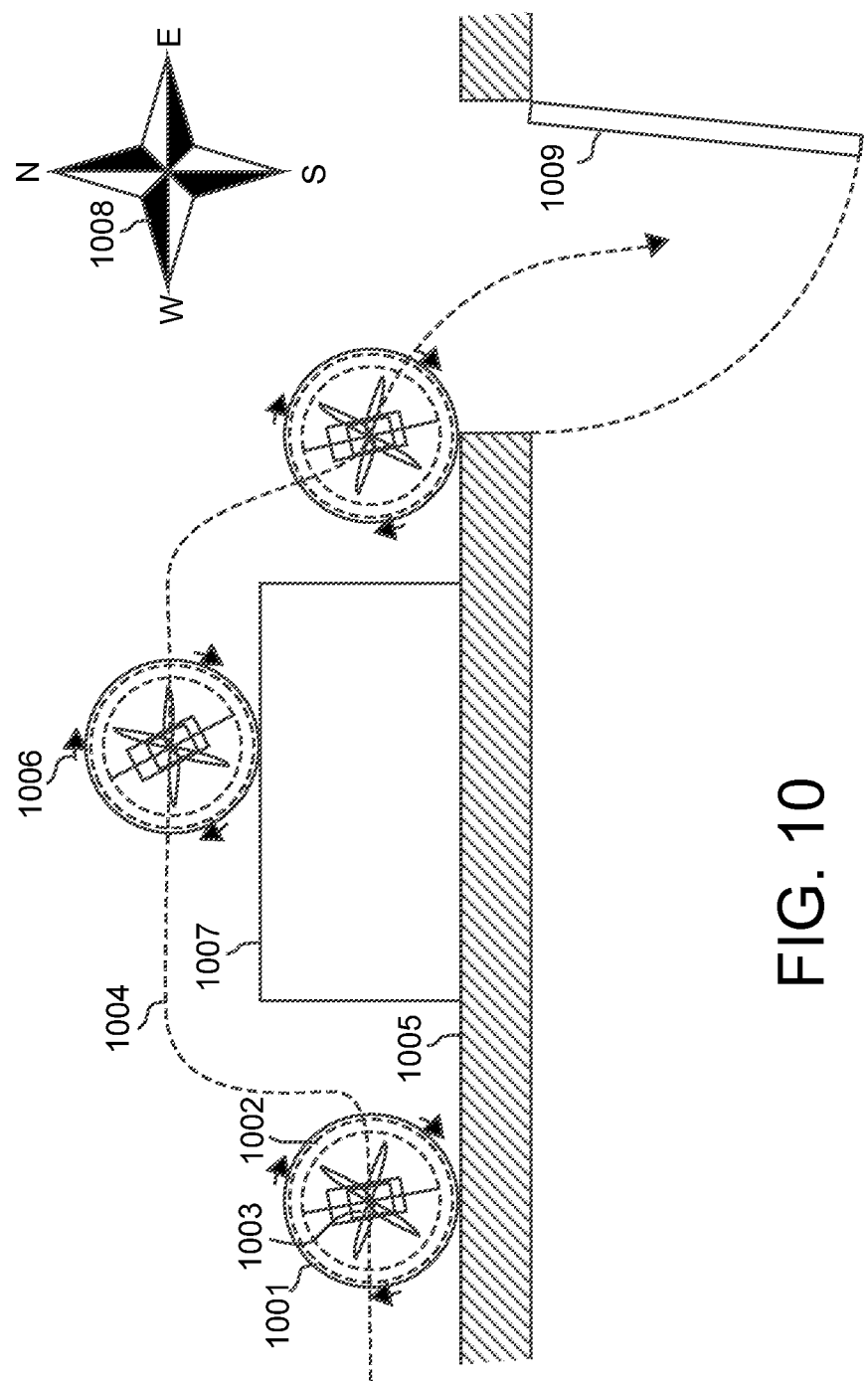
FIG. 10 illustrates a top view of an aerial vehicle according to the disclosure equipped with a gimbal system that rolls on vertical obstacles.

As mentioned above, the VTOL according to the disclosure allows the outer frame to stay in contact with an obstacle, be it below, sideways, or above the outer frame, and the VTOL may move with respect to the obstacle while staying in contact with it, which is described herein as "rolling on it." Referring now to FIG. 9. since the orientation of the inner frame 903 is not constrained, the inner frame can move relative to the outer frame 901 to maintain appropriate lift and direction while the outer frame remains in constant contact with obstacles. This allows the aerial vehicle to roll on obstacles by controlling a motion towards any desired direction and keeping a component of the control force towards the obstacle in order to remain in contact. This is particularly useful to go around obstacles of complex shapes without the need for extra control to follow complex trajectories. FIGS. 9 and 10 show examples of such behaviors.

FIG. 9 illustrates a side-view of an aerial vehicle equipped with a gimbal system 902 that rolls on uneven ground 905 along a rightwards trajectory 904 by controlling a motion towards the right while maintaining a downwards force (e.g. by generating a lift force with the propulsion system that is lower than the take-off force) in order to remain in contact with the obstacle. While the inner frame 903 remains in the orientation controlled by the control system, the outer frame 901 rotates with a certain angular speed 906.

FIG. 10 illustrates a top view of an aerial vehicle equipped with a gimbal system 1002 that rolls against vertical walls 1005 or obstacles 1007 by controlling a sideways motion towards the direction parallel to the walls, while remaining in contact with the obstacle by controlling a side force towards the obstacle. While the inner frame 1003 remains in the orientation controlled by the control system, the outer frame 1001 rotates with a certain angular speed 1006. Such behavior allows the aerial vehicle to follow the contours of the environment, which is useful when looking for openings like a door 1009. This behavior does not require complex control or sensing to be achieved, as it is enough to fly toward a direction (e.g. given by the magnetic direction 1008).

While rolling against obstacles, using feedback from an orientation sensor 810 mounted on the outer frame allows control of the rolling speed as well as when the aerial vehicle is not rolling anymore because it is stuck in a local minima (e.g: corner).

Take-Off from any Orientation

Figures 11A, 11B, 11C:
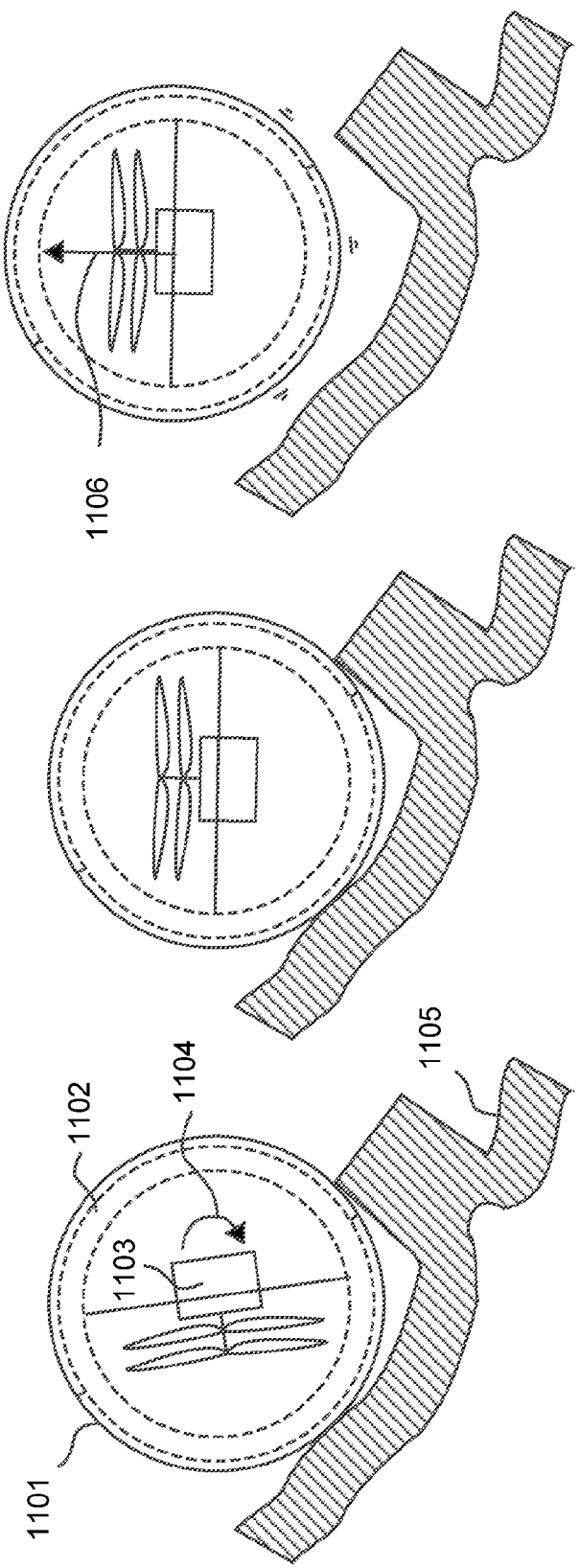
FIG. 11(a) illustrates an aerial vehicle according to the disclosure equipped with a gimbal system resting on the ground at an orientation not appropriate for take-off.
FIG. 11(b) illustrates the aerial vehicle of FIG. 11(a) equipped with a gimbal system ready to take-off.
FIG. 11(c) illustrates the aerial vehicle of FIG. 11(b) taking off.

Referring now to FIGS. 11(a)-11(c), the system according to the disclosure is also useful to take-off from any orientation: when on the ground, the inner frame 1103 can rotate easily inside the outer frame 1101 as a function of the gimbal system 1102 and a mechanism can thus rotate the inner frame to an orientation appropriate for take-off. If the center of mass is placed at the crossing of the gimbal's rotation axes, the inner frame can be rotated in the desired orientation with minimal torques (just enough to overcome the friction in the gimbal system). The control system of the inner frame can typically be used to rotate the inner frame in a take-off orientation.

FIG. 11(a) illustrates an aerial vehicle equipped with a gimbal system 1102 resting on the ground 1105 at an orientation not appropriate for take-off. Therefore it uses its control system to generate enough torque T 1104 to rotate the inner frame 1103 to a vertical orientation while the outer frame remains static. FIG. 11(b) illustrates the aerial vehicle ready to take-off because the propulsion system is in an orientation where it is able to generate a force pointing upwards. FIG. 11(c) illustrates the propulsion system generates a vertical thrust T 1106 which makes the aerial vehicle take-off.

Protective Structures

The outer frame should prevent external objects from touching the inner frame or the gimbal system and should not strongly affect the propulsion system, typically by obstructing the airflow. In addition, while remaining lightweight the outer frame should be able to absorb collision energy without breaking, and it should be stiff enough to protect the gimbal system and inner frame but flexible enough to reduce the peak contact force, and thus the strain on the rest of the system. Three different designs for the outer frame are illustrated in FIGS. 12(a), 12(b) and 12(c).

Figure 12A:
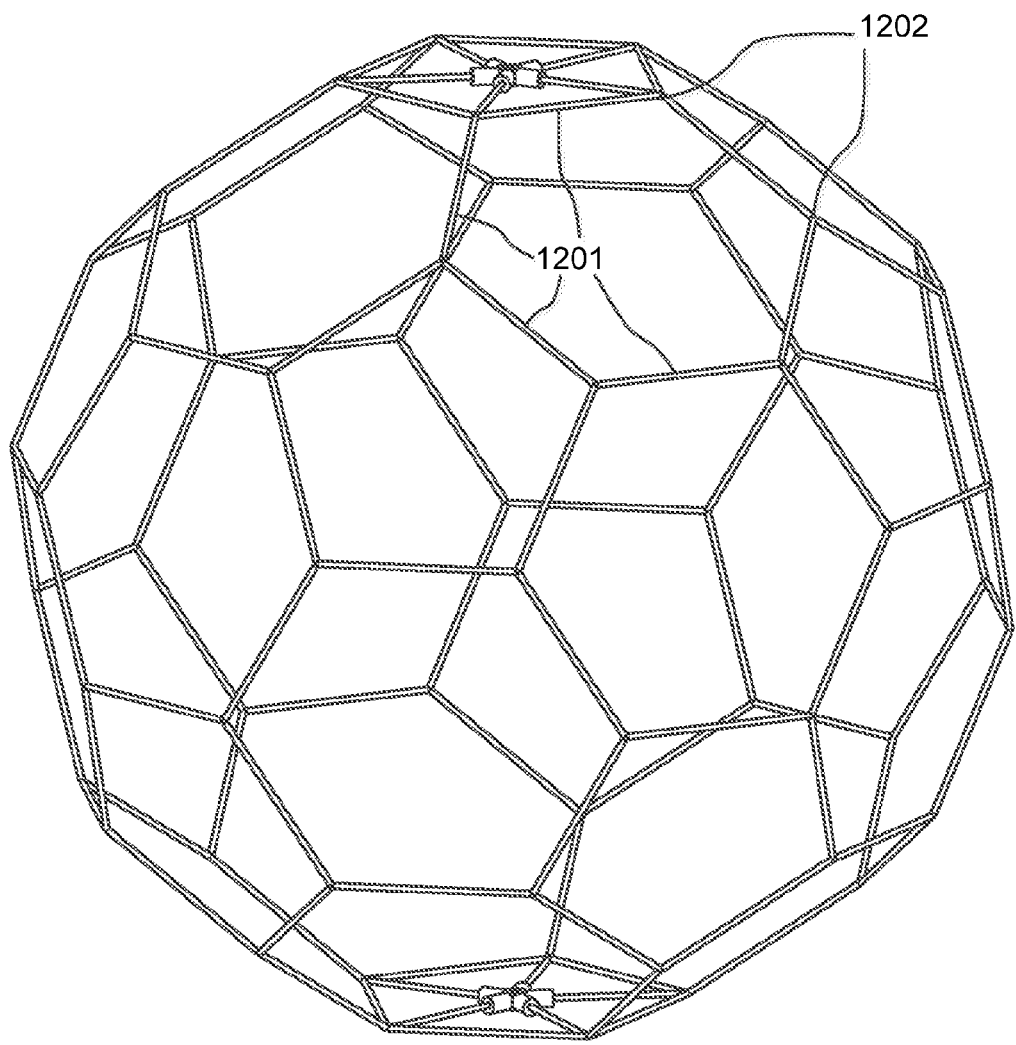
FIG. 12(a) illustrates an example of a protective outer frame based on beams outlining a spherical polyhedron, in particular a truncated icosahedron is illustrated.

The first design for the outer frame shown in FIG. 12(a) is based on beams 1201 fixed to each other at connecting points 1202, and arranged so that each beam defines an edge of a spherical polyhedron. When a force is applied on a spherical polyhedron, the load is shared among all the beams of the structure. Such a structure is thus able to absorb a relatively high collision energy for its weight. Also, the numerous beams prevent most external objects from touching the gimbal system or the inner frame. Finally, the spherical shape is advantageous for rolling on obstacle.

Figure 12B:
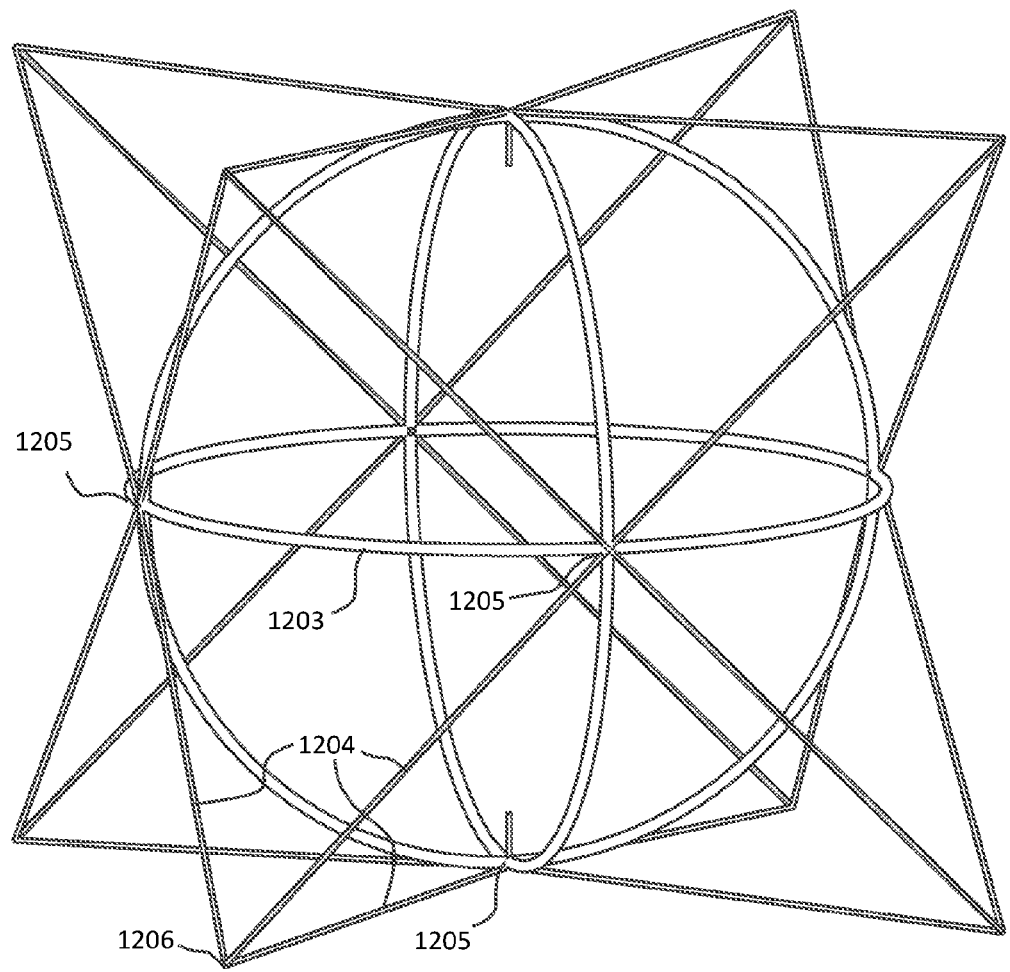
FIG. 12 (b) illustrates an example of a protective outer frame using tetrahedral bumpers made of three flexible beams attached to a rigid base.
FIG. 12(c) illustrates an example of a protective outer frame based on triangular structures forming modular components for ease of construction.

The second design for the outer frame shown in FIG. 12(b) is based on a relatively stiff base 1203 on which tetrahedral structures made of three flexible beams 1204 are mounted with pivot joints 1205 and 1206 to act as elastic bumpers that absorb the collision energy. The tetrahedral arrangement allows at least one of the beam to work in buckling mode when a force is applied on the structure. Buckling allows maximizing the energy a single beam can absorb, because the deformation force is close to maximal from the beginning to the end of the deformation.

Figure 12C:
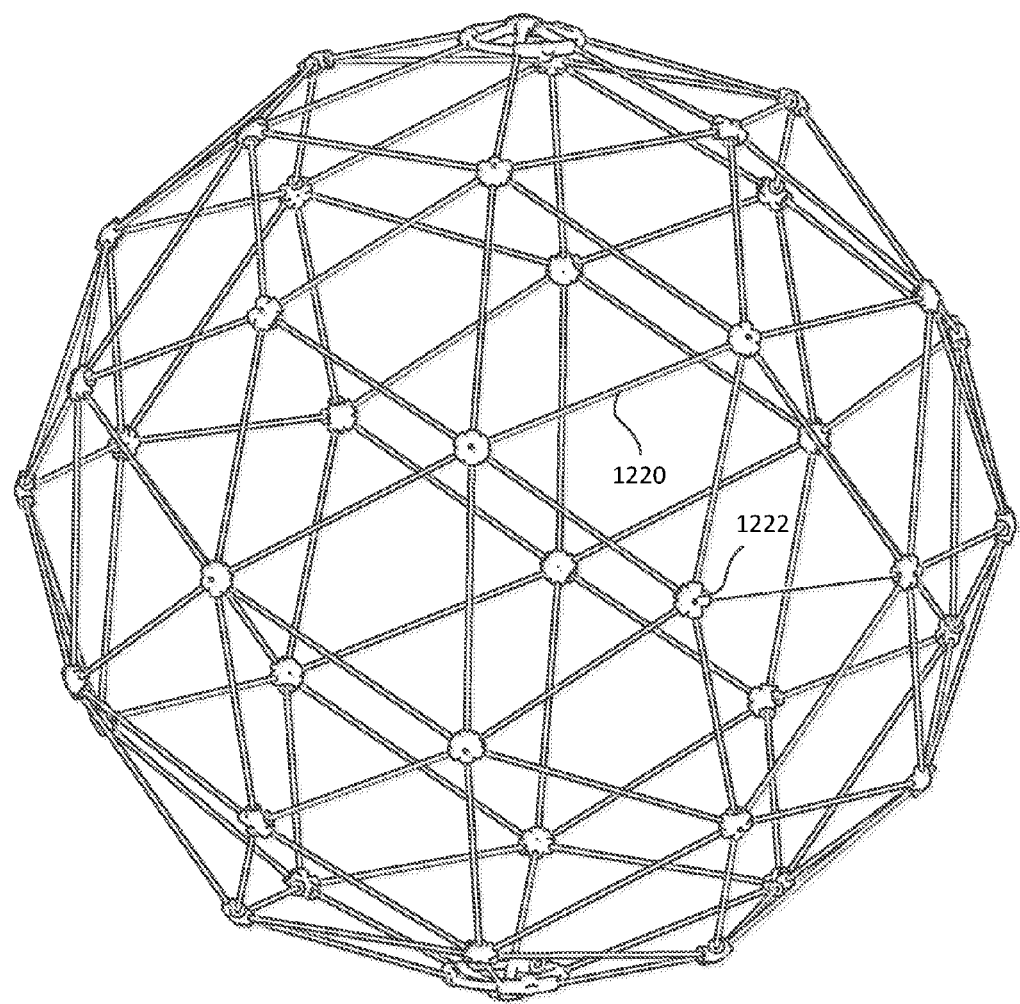

A third outer frame design is illustrated in FIG. 12(c). This design is based on triangle structures 1220 which can be readily mass produced and assembled. Lightweight composite clips 1222 are used to assemble the sides of the triangles. The triangles may be pre-assembled into a plurality of sub-assemblies, pentagons or hexagons, that may be packaged as a kit for ease of storage and transport. The sub-assemblies may be assembled into the outer frame for housing the structures of the VTOL described hereinbefore.

FIG. 12(a) illustrates an example of a protective outer frame based on beams 1201 outlining a spherical polyhedron, in particular a truncated icosahedron in this case. Such a frame allows appropriate stiffness with minimal weight. FIG. 12(b) illustrates an example of a protective outer frame using tetrahedral bumpers made of three flexible beams 1204 attached to a rigid base 1203 with pivot joints 1205 and 1206 to provide flexibility. Thanks to the tetrahedral arrangement, the beams work in buckling mode which allows maximized energy absorption for a given beam. FIG. 12(c) illustrates a configuration that is relatively easily mass produced and packaged as sub-assemblies for ease of storage and transportation, and packaging as a kit for easy assembly.

Aerial Vehicles

For a given payload to carry, the optimal choice for the propulsion system is generally the one with the best lift force to area ratio, because the size of the propulsion system will determine the size, thus the weight of the gimbal system and the outer frame, which should be minimized. Typically, coaxial configurations like the ones presented in FIGS. 1(c) and (d) have a good lift force to area ratio.

Embodiments shown in FIGS. 13(a) through 13(d) and 14(a) and 14(b) show examples of aerial vehicles equipped with the protective structures described above.

Figure 13B:
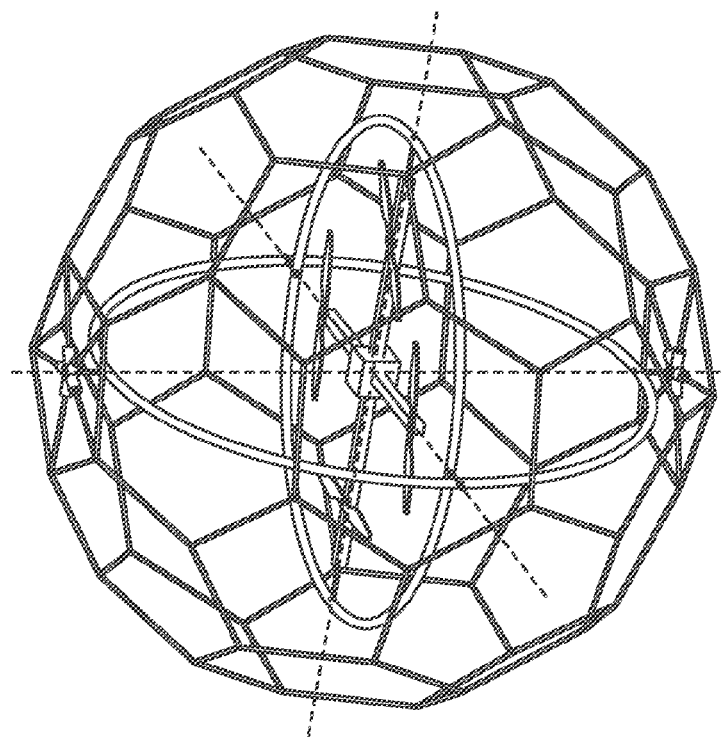
FIG. 13(b) illustrates an aerial vehicle equipped with a gimbal system and a spherical polyhedron as outer frame wherein an inner frame comprises a multi-rotor.
Figure 13A:
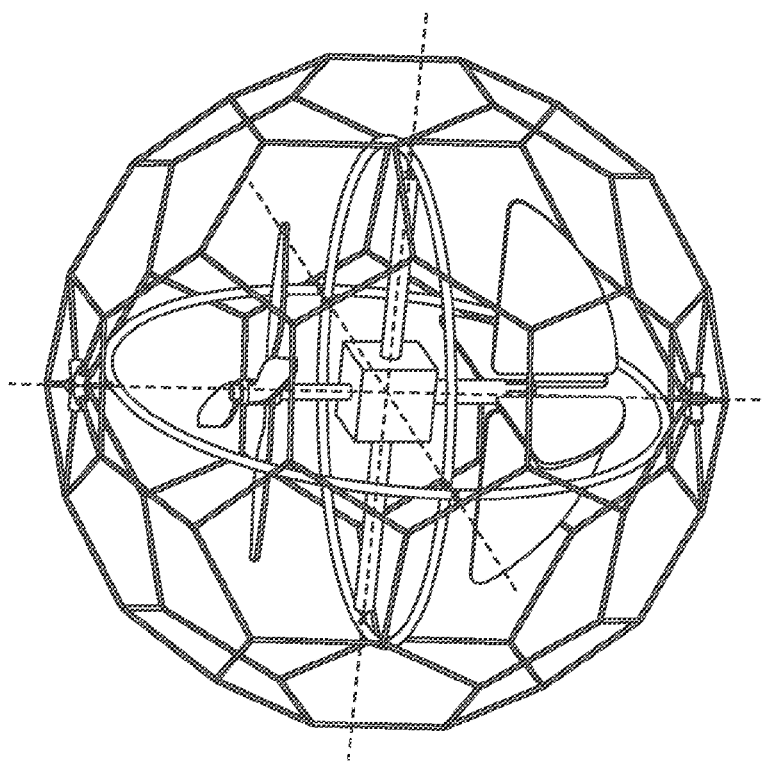
FIG. 13(a) illustrates an aerial vehicle equipped with a gimbal system and a spherical polyhedron as outer frame wherein an inner frame comprises a coaxial design with control surfaces.
Figure 13D:
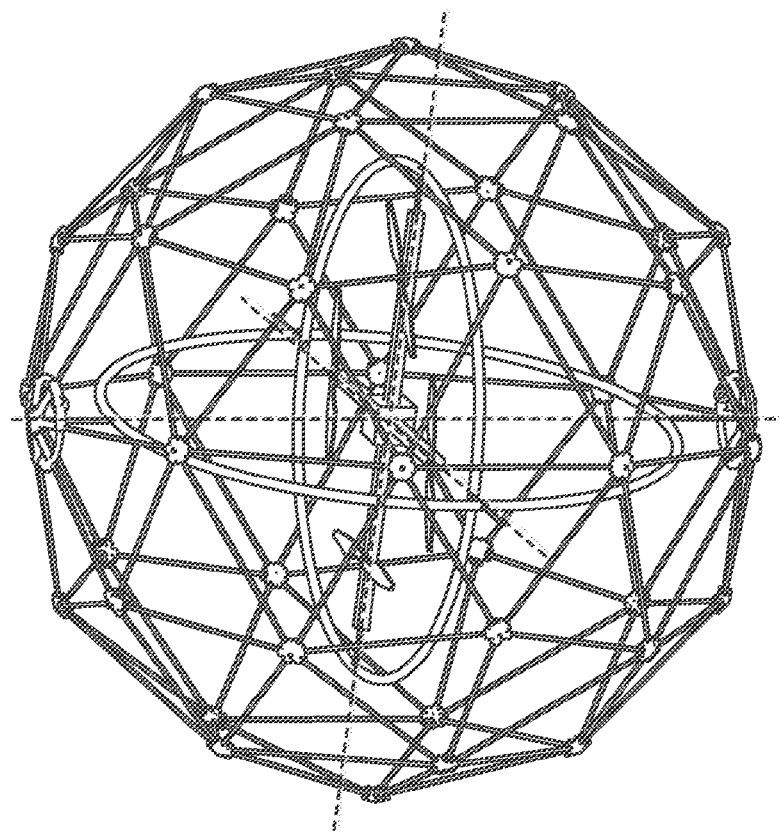
FIG. 13(d) illustrates an aerial vehicle equipped with a gimbal system and an outer frame based on triangular structures forming modular components wherein an inner frame comprises a multi-rotor.
Figure 13C:
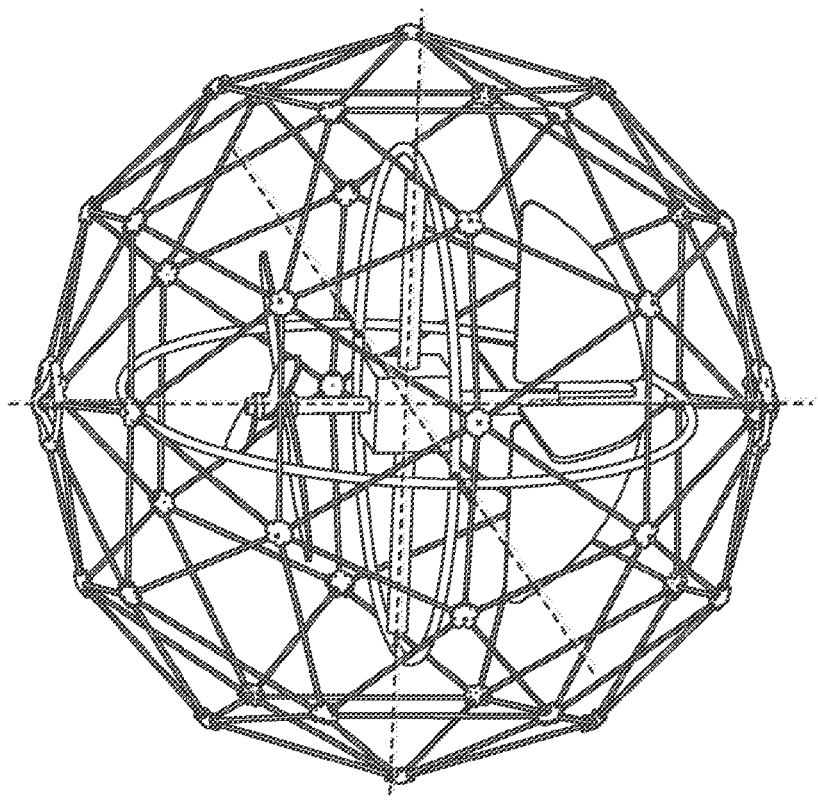
FIG. 13(c) illustrates an aerial vehicle equipped with a gimbal system and an outer frame based on triangular structures forming modular components wherein an inner frame comprises a coaxial design with control surfaces.

FIGS. 13(a) and 13(b) illustrate aerial vehicles equipped with a decoupling mechanism or gimbal system comprised of an inner ring rotationally coupled to a beam, and a spherical polyhedron as outer frame. FIG. 13(a) illustrates an inner frame comprises a coaxial design with control surfaces. FIG. 13(b) illustrates an inner frame comprises a multi-rotor. FIGS. 13(c) and 13(d) illustrate aerial vehicles with triangle structures and clips forming modular components for the outer frame. FIG. 13(c) illustrates an aerial vehicle equipped with a gimbal system and an outer frame based on triangular structures forming modular components wherein an inner frame comprises a coaxial design with control surfaces. FIG. 13(d) illustrates an aerial vehicle equipped with a gimbal system and an outer frame based on triangular structures forming modular components wherein an inner frame comprises a multi-rotor.

FIGS. 14(a) and 14(b) illustrate aerial vehicles equipped with a gimbal system and tetrahedral bumpers protecting the outer frame. FIG. 14(a) illustrates an inner frame or beam rotationally coupled to an inner ring and comprising a coaxial design with control surfaces, while FIG. 14(b) illustrates an inner frame comprising a multi-rotor.

Decoupling mechanisms as described herein are mechanical apparatuses that provide 1 or more rotation degrees of freedom of the outer frame with respect to the inner frame or components (e.g. inner ring, beam and other structures as described herein). The rotation freedoms are along rotation axes, which are typically generated by mechanical rotation joints or by other mechanical means as described.

Figure 15:
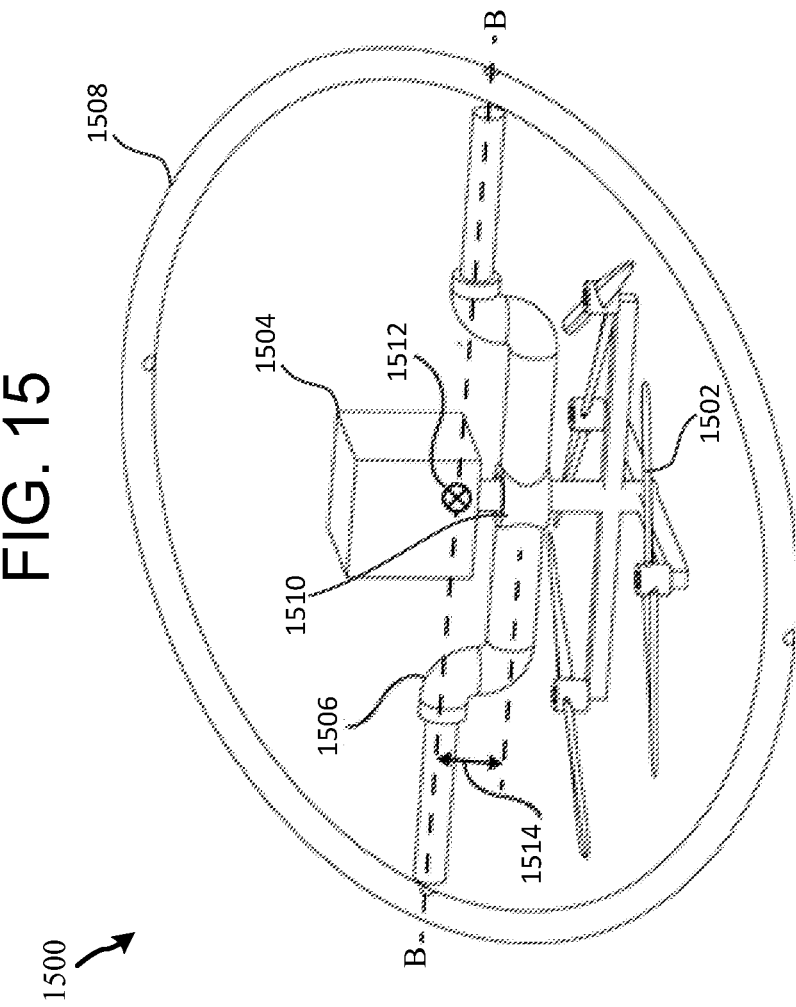
FIG. 15 illustrates portions of an aerial vehicle including a decoupling mechanism comprising a non-straight beam and a ring.
Figure 16:
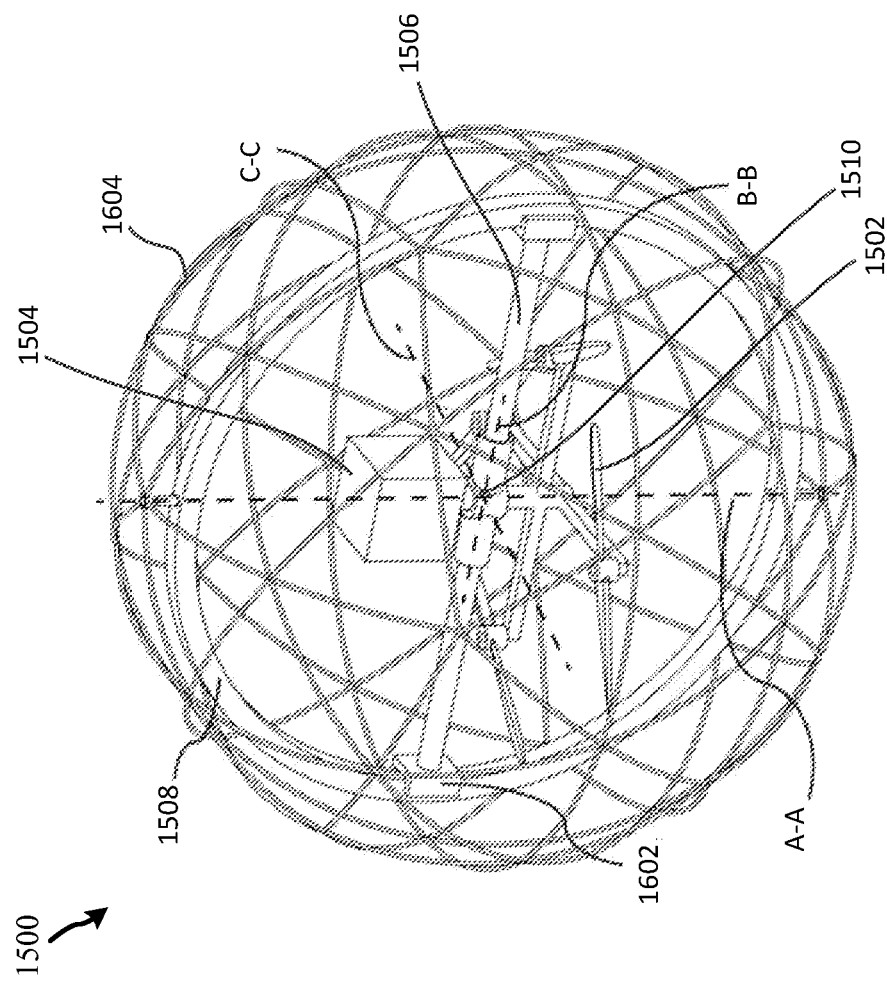
FIG. 16 illustrates an aerial vehicle including a decoupling mechanism comprising a straight beam with sliders and a ring, with a propulsion system comprising a quadrotor configuration.

FIGS. 15 and 16 illustrate further alternative embodiments of an aerial vehicle 1500 according to the present disclosure. The aerial vehicle 1500 includes propellers 1502 that generate propulsive forces to move the aerial vehicle 1500, and a control system/electronics block 1504 that includes, for example, the electronics used to control the aerial vehicle 1500, the battery, and the payload (e.g. a camera or other instrumentation). The control system 1504 may be located above a beam 1506 or a rotation joint 1510 described below and the propulsion system may be located below the beam 1506. The aerial vehicle 1500 also includes a decoupling mechanism including the beam 1506 and a ring 1508. The beam 1506 has a rotation joint 1510 located near the center of the beam 1506. The rotation joint 1510 may be configured to provide at least two axes of rotation, illustrated as A-A and B-B (best seen in FIG. 16). The rotation axes A-A, B-B may be substantially perpendicular/orthogonal, and preferably are perpendicular/orthogonal to each other. The rotation axis B-B may be substantially coaxial to a length of the beam 1506, while the rotation axis A-A may be substantially perpendicular with the beam 1506.

As illustrated, the beam 1506 may be non-straight/non-linear (as illustrated in FIG. 15) or straight (as illustrated in FIG. 16). When the beam 1506 is non-linear, a center of mass 1512 of the inner frame is located above the rotation joint 1510 along the rotation axis B-B. Offset of the rotational joint 1510 from the axis of rotation B-B is depicted as 1514. For example, the rotation axis B-B may be created by one or more bearings that interact with the beam 1506 to allow the beam 1506 to rotate. The rotation axis A-A may be created by one or more bearings located within the rotation joint 1510 that allow rotation of one or more elements of the inner frame. The non-straight beam can accommodate inner frames of arbitrary shapes, and allows more freedom for component placement on the inner frame, typically while ensuring that the center of mass (COM) of the inner frame is mostly aligned with the rotation axes. With specific reference to FIG. 16, a beam 1506 having sliders 1602 is described. The sliders 1602 slide freely along the ring 1508. The sliders 1602 may include one or more bearings located therein that allow the ring 1508 to move easily through the sliders 1602. Alternatively, movement of the ring through the sliders may be facilitated by implementation using materials with a low coefficient of friction. Use of the sliders 1602 on the beam 1506 creates an additional rotation axis C-C. This results in the aerial vehicle 1500 have a total of three rotation axes A-A, B-B, C-C. Put another way, use of the sliders 1602 on the beam 1506 results in the inner frame having three degrees of freedom. An outer frame 1604 may be movably coupled to the inner frame. Coupling of the outer frame 1604 to the decoupling mechanism may include the use of one or more bearings. Moreover, the outer frame 1604 may be indirectly coupled to the ring 1508 of the decoupling mechanism. While it has been described that the sliders 1602 may be implemented on the straight beam 1506, one skilled in the art should appreciate that the sliders 1602 may be implemented on the non-linear beam 1506 without departing from the scope of the present disclosure.

FIG. 17 illustrates the aerial vehicle 1500 having a decoupling mechanism comprised of the beam 1506 and the ring 1508. The aerial vehicle includes two propellers 1502 and the control system/electronics block 1504. Between the propellers 1502 and the control system 1504 is the rotation joint 1510 and below the control system 1504 are control surfaces 1702. The control surfaces 1702 may be comprised of two pairs, with each pair of control surfaces 1702 including two parallel control surfaces 1702. The control surfaces 1702 control the pitch motion and roll motion of the aerial vehicle 1500.

FIGS. 18(a) and 18(b) illustrate the beam 1506 according to the present disclosure in alternative configurations, as described in relation to FIGS. 16 and 15, respectively. The beam 1506 may be linear (illustrated in FIG. 18(a)) or non-linear (FIG. 18(b)). The non-linear beam 1506 has four bends (two pairs) located therein. For example, the two bends 1802 closest to the rotation joint 1510 may bend at substantially 90° in the same direction and the two bends 1804 furthest away from the rotation joint 1510 may bend at substantially 90°, resulting in the beam 1506 having two substantially parallel portions. The rotation axis B-B of the bent beam 1506 runs through the linear portions distal from the rotation joint 1510. One or more bearings may be implemented within the rotation joint 1510 to allow rotation about the rotation axes A-A, B-B. The beam 1506 may have rotation joints 1806 that allow the beam 1506 to directly or indirectly couple to the ring 1508 (not illustrated). The rotation joints 1806 may be located at distal, exterior ends of the beam 1506.

FIG. 18(c) illustrates the beam 1506 having sliders 1602. The sliders 1602 couple at least one sliding surface to the ring 1508. The sliders 1602 may be implanted on both of the beams illustrated in FIGS. 18(a) and 18(b). Implementation of the sliders 1602 on the beam 1506 creates another rotation axis separate from the rotation axes A-A, B-B. Illustration of the rotation axis created by use of the sliders 1602 is depicted as rotation axis C-C in FIG. 16. The sliders can be coupled to a ring which is rigidly attached to the outer frame.

Figure 19A:
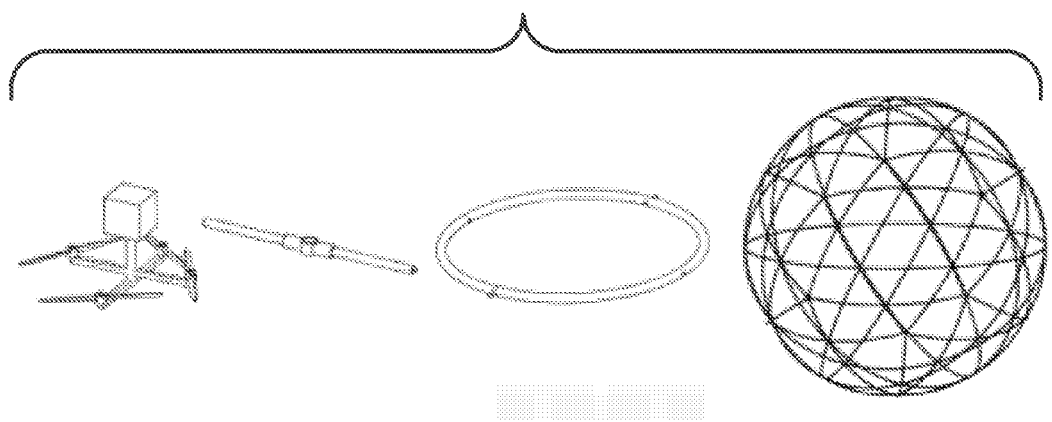
FIGS. 19(a) through 19(e) illustrate various exploded views of decoupling mechanism configurations including the beam according to the disclosure.
Figure 19B:
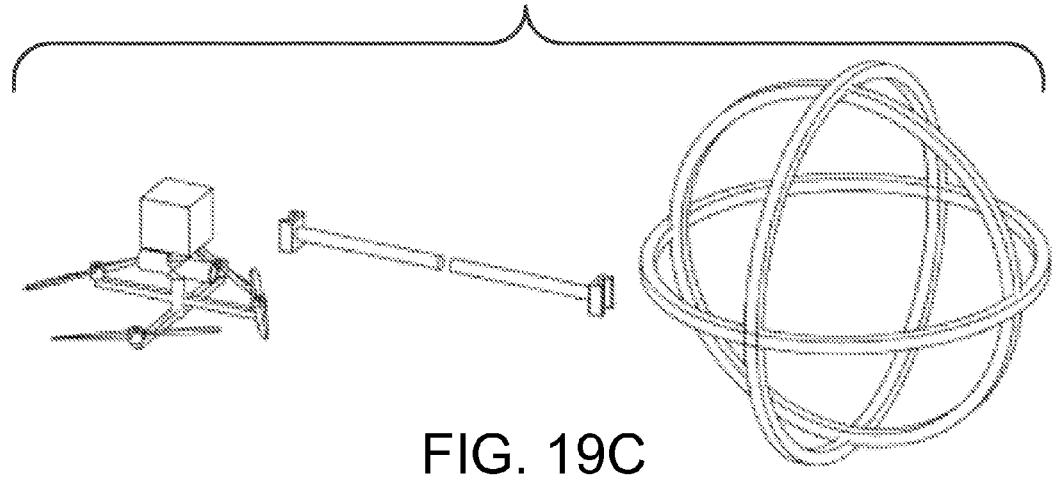
Figure 19C:
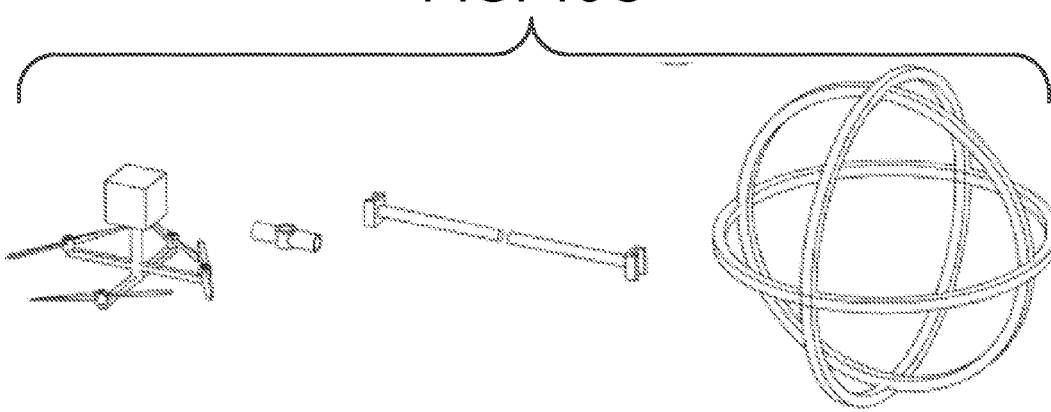
Figure 19D:
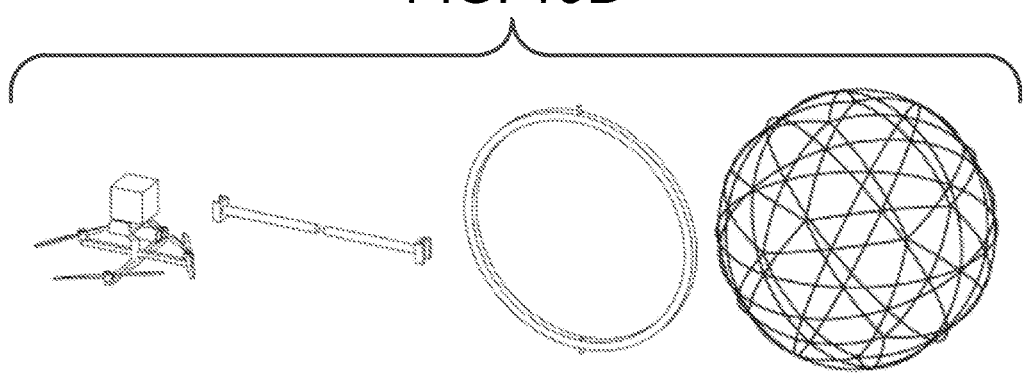
Figure 19E:
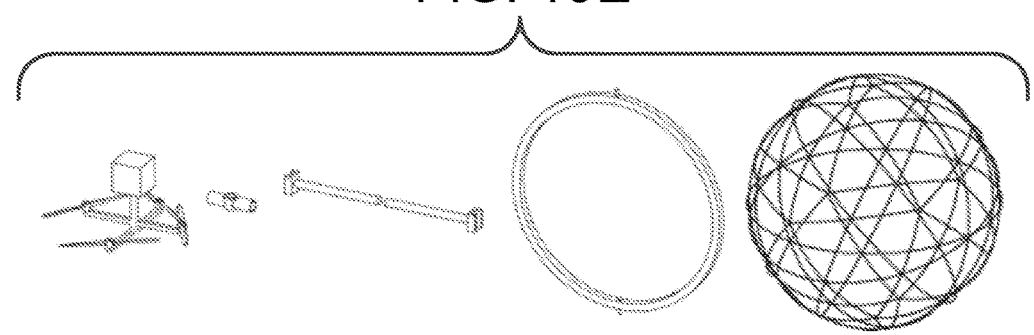

FIGS. 19(a) through 19(e) illustrate exploded views of various combinations and configurations of the decoupling mechanism components according to the present disclosure. Specifically, FIG. 19(b) illustrates a decoupling mechanism providing 2 degrees of rotation freedom (2 rotation axes), FIGS. 19(a), 19(c), and 19(d) illustrate decoupling mechanisms providing 3 degrees of rotation freedom (3 rotation axes), and FIG. 19(e) illustrates a decoupling mechanism providing 4 degrees of rotation freedom (4 rotation axes). FIG. 19(c) illustrates a configuration of the decoupling mechanism which provides 3 degrees of rotation freedom while not comprising a single decoupled ring, the only ring being rigidly attached to the protective frame.

Figure 20A:
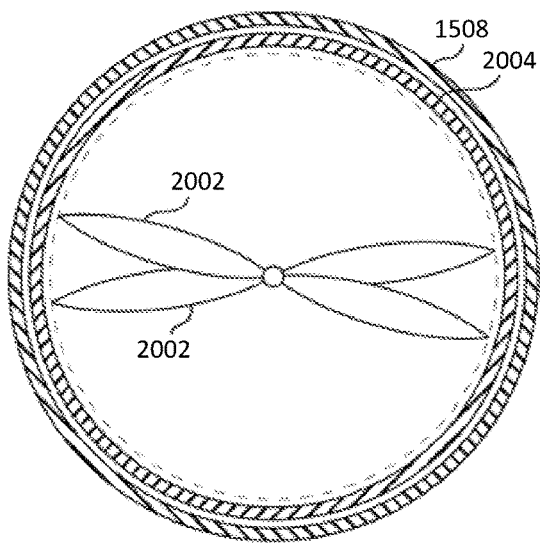
FIGS. 20(a) through 20(d) illustrate plan views of coaxial and quadrotor aerial vehicles having overlapping propeller configurations in relation to various decoupling mechanisms.
Figure 20B:
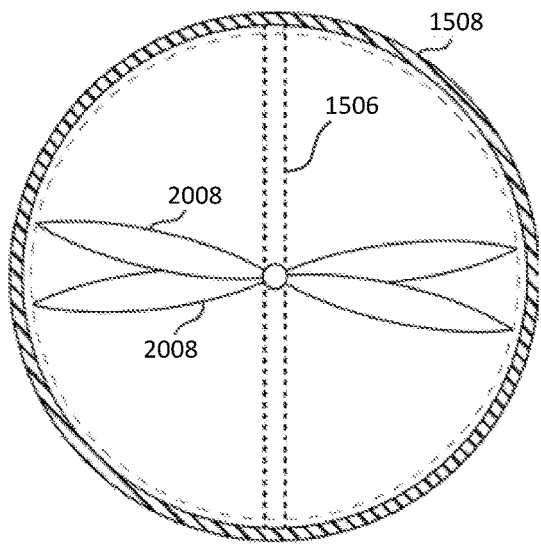

FIGS. 20(a) through 20(d) show the effects on propulsion system size of aerial vehicles having various decoupling mechanisms according to the present disclosure. Referring to FIGS. 20(a) and 20(b), coaxial rotor aerial vehicles are illustrated. The aerial vehicle illustrated in FIG. 20(a) includes two propellers 2002 and a decoupling mechanism having two different rings 2004, 1508. The aerial vehicle illustrated in FIG. 20(b) includes two propellers 2008 and a decoupling mechanism having the beam 1506 coupled to the ring 1508. By implementing the beam 1506, the inner ring 2004 of the decoupling mechanism can be removed, resulting in the propellers 2008 being larger than the propellers 2002 without enlargement of the outer ring 1508. Thus, implementation of the inner frame including the beam 1506 is beneficial because it allows the propulsion system of the aerial vehicle to be larger without changing the outer size of the aerial vehicle. Having a larger propulsion system allows for increased flight time, increased reactivity, and increased payload capability, for example.

Figure 20C:
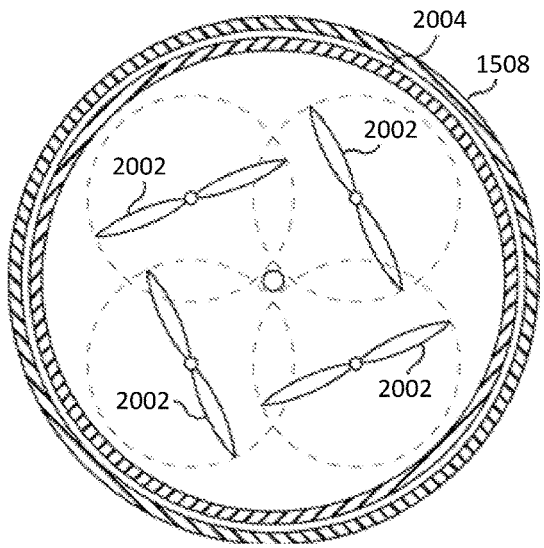
Figure 20D:
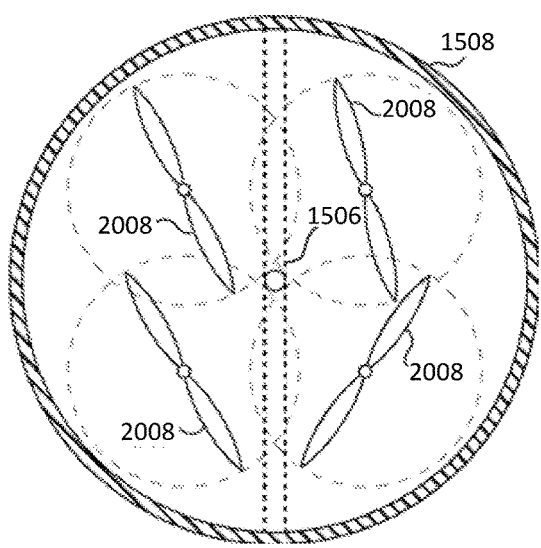

Referring to FIGS. 20(c) and 20(d), quadrotor aerial vehicles are illustrated. The quadrotor aerial vehicle of FIG. 20(c) includes four propellers 2002 and a decoupling mechanism having two different rings 2004, 1508. The quadrotor aerial vehicle of FIG. 20(d) includes four propellers 2008 and a decoupling mechanism having the beam 1506 coupled to the ring 1508. Like the coaxial rotor aerial vehicles of FIG. 20(a), by implementing the beam 1506 within the quadrotor aerial vehicle, the inner ring 2004 of the decoupling mechanism can be removed, resulting in the propellers 2008 being larger than the propellers 2002 without enlargement of the outer ring 1508. Thus, implementation of the decoupling mechanism including the beam 1506 is beneficial because it allows the propulsion system of the aerial vehicle to be larger without changing the outer size of the aerial vehicle. Having a larger propulsion system allows for increased flight time, increased reactivity, and increased payload capability, for example.

The propellers 2002, 2008 of the quadrotor aerial vehicles of FIGS. 20(c) and 20(d) may be configured to overlap each other, resulting in the aerial vehicle being more compact. Compactness is the ratio between an external dimension of the propulsion system of the aerial vehicle and an external dimension of one propeller of the aerial vehicle. By having the propellers 2002, 2008 configured to overlap, advantage of the high performances of quadrotors (i.e., mechanical simplicity, high reactivity, etc.) are obtainable while reducing the typical large size of quadrotors.

Various benefits of the decoupling mechanisms have been disclosed herein, and other benefits should be apparent to those skilled in the art. Without limitation, specific benefits of the disclosed decoupling mechanisms include:

Gimbal lock sensitivity reduction: Gimbal locks occurring to the disclosed decoupling mechanisms have less impact on the stability of the aerial vehicle. A gimbal lock is a loss of one degree of freedom, which occurs when the third axis of rotation C-C is aligned with the first axis of rotation A-A. When the axes A-A, C-C are substantially aligned, a small cage rotation typically generates large motions of the decoupling mechanism, which generates virtual friction in the decoupling mechanism because of the inertia of the mechanical parts that need to be accelerated. In the disclosed configurations, the beam has less inertia than the ring it replaces.

Obstruction reduction: Vertical ring implementations often obstruct the view of the camera. In the implementations involving the decoupling mechanisms of FIGS. 15A through 21E, there is only one ring that is often horizontal, thus not in the field of view of the camera.

While embodiments described herein include propulsion systems comprised of coaxial propellers or quadrotors, one skilled in the art should appreciate that any of various propulsion systems may be implemented including those described in FIGS. 1(a) through 1(d) without departing from the scope of the present disclosure.

Although the devices, systems, and methods have been described and illustrated in connection with certain embodiments, many variations and modifications will be evident to those skilled in the art and may be made without departing from the spirit and scope of the disclosure. The discourse is thus not to be limited to the precise details of methodology or construction set forth above as such variations and modification are intended to be included within the scope of the disclosure.

What is claimed is:

1. A vertical take-off and landing (VTOL) aerial vehicle, comprising:
   an outer frame; and,
   a decoupling mechanism; and
      an inner frame connected to the outer frame by the decoupling mechanism, the inner frame comprising a propulsion system configured to generate a lift force;
   the decoupling mechanism comprising a beam coupled to the inner frame and forming a first rotation axis, and the beam being coupled to a second rotation axis substantially orthogonally disposed with respect to the first rotation axis.

2. The VTOL aerial vehicle of claim 1, wherein the inner frame has a center of mass substantially in line with each rotation axis.

3. The VTOL aerial vehicle of claim 1, wherein the first rotation axis is substantially vertical.

4. The VTOL aerial vehicle of claim 1, wherein the beam is non-linear.

5. The VTOL aerial vehicle of claim 1, wherein the propulsion system comprises four propellers, at least portions of two of the propellers overlapping.

6. The VTOL aerial vehicle of claim 1, wherein the propulsion system comprises four propellers, at least portions of two of the propellers overlapping.

7. The VTOL aerial vehicle of claim 1, wherein the beam is comprised of two parallel portions, one of the parallel portions being in axial alignment with a center of mass of the VTOL aerial vehicle.

8. The VTOL aerial vehicle of claim 1, further comprising a ring coupled to the beam and the ring coupled to the outer frame in a third rotation axis, the second and third rotation axes being substantially orthogonal.

9. The VTOL aerial vehicle of claim 1, wherein the beam includes sliders; and a ring coupled to the sliders, the ring rotating in a second rotation axis about the beam, the ring further sliding through the sliders in a third rotation axis, the second and third rotation axes being orthogonal.

10. A vertical take-off and landing (VTOL) aerial vehicle, comprising:
    an outer protective cage;
    an inner frame comprising propulsion means for generating a lift force;
    control means for controlling orientation of the inner frame; and
    a decoupling means for providing at least two (2) rotation degrees of freedom of the inner frame with respect to the outer protective cage.

11. The VTOL aerial vehicle of claim 10, wherein the decoupling means comprises a beam with sliding surfaces coupled to a ring.

12. The VTOL aerial vehicle of claim 10, wherein the decoupling means comprises a beam with sliding surfaces coupled to a ring, the beam having a rotation joint centrally located along the beam, the decoupling means providing four (4) rotation degrees of freedom.

13. The VTOL aerial vehicle of claim 10, wherein the decoupling means comprises a beam coupled to a ring with rotation joints on extreme ends where the beam interconnects with the ring, the beam having a rotation joint centrally located along the beam, the decoupling means providing three (3) rotation degrees of freedom.

14. The VTOL aerial vehicle of claim 10, wherein the decoupling means comprises a beam, the beam comprising two substantially parallel portions.

15. The VTOL aerial vehicle of claim 10, wherein the propulsion means comprises four propellers, at least portions of two of the four propellers overlapping.

16. A vertical take-off and landing (VTOL) aerial vehicle, comprising:
    an outer frame;
    an inner ring coupled to the outer frame;
    a beam rotationally coupled to the inner ring;
    a propulsion system configured to generate a lift force; the propulsion system coupled to the beam by a decoupling means providing at least two rotation degrees of freedom of the propulsion system with respect to the inner ring.

17. The VTOL aerial vehicle of claim 16, wherein the propulsion system comprises propellers that partially overlap when in motion.

18. The VTOL aerial vehicle of claim 16, wherein the beam further comprises sliders coupled to the inner ring to rotationally couple the beam to the inner ring.

19. The VTOL aerial vehicle of claim 16, wherein the plurality of outer rings have no degrees of freedom of rotation with respect to the inner ring.

20. The VTOL aerial vehicle of claim 16, wherein the inner ring has at least one degree of freedom of rotation with at least one of the plurality of outer rings.

* * * * *